United States Patent
Hill et al.

(10) Patent No.: US 9,630,614 B1
(45) Date of Patent: Apr. 25, 2017

(54) MODULAR POWER PLANTS FOR MACHINES

(71) Applicant: MIQ LLC, Bellevue, WA (US)

(72) Inventors: William McGinley Hill, Seattle, WA (US); Adam Monroe Livesay, Seattle, WA (US); Steven Richard Schwasnick, Rocklin, CA (US)

(73) Assignee: MIQ LLC, Bellevue, WA (US)

( * ) Notice: Subject to any disclaimer, the term of this patent is extended or adjusted under 35 U.S.C. 154(b) by 0 days.

(21) Appl. No.: 15/009,566

(22) Filed: Jan. 28, 2016

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/13 | (2016.01) |
| B60W 10/06 | (2006.01) |
| B60W 10/08 | (2006.01) |

(Continued)

(52) U.S. Cl.
CPC ......... *B60W 20/13* (2016.01); *B60H 1/00271* (2013.01); *B60W 10/06* (2013.01); *B60W 10/08* (2013.01); *B60W 10/26* (2013.01); *B60W 2710/0677* (2013.01); *B60W 2710/086* (2013.01); *B60W 2710/242* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,272,873 B1 * | 8/2001 | Bass | B60H 1/00428 62/238.3 |
| 6,862,589 B2 | 3/2005 | Grant | |
| 8,004,663 B1 | 8/2011 | Melvin | |

(Continued)

OTHER PUBLICATIONS

Office Communication for U.S. Appl. No. 14/449,936 mailed on Mar. 23, 2016 (17 pages).

(Continued)

*Primary Examiner* — Mussa A Shaawat
*Assistant Examiner* — Kyung Kim
(74) *Attorney, Agent, or Firm* — John W. Branch; Lowe Graham Jones PLLC

(57) ABSTRACT

Embodiments are directed towards modular power plants that provide power to operate machines. A power plant is a combustion-electric hybrid power plant that includes at least one or more engines, one or more generators, and one or more battery arrays. The battery arrays include one or more modular batteries. Rather than the engine directly providing power to the machine, the engine and generators charge the batteries. The batteries provide the power required to operate the machine. A user may vary the maximum power output of the power plant by varying the number and/or type of modular batteries included in the one or more battery arrays. The specific configuration of the batteries may be based on the power requirements of the machine's expected usage or operation. The power plant is configured to a specific machine application by installing and/or removing batteries from the battery arrays based on the machine's power requirements.

19 Claims, 11 Drawing Sheets

(51) Int. Cl.
*B60W 10/26* (2006.01)
*B60H 1/00* (2006.01)

(56) References Cited

U.S. PATENT DOCUMENTS

| | | |
|---|---|---|
| 2002/0077779 A1 | 6/2002 | Liebl et al. |
| 2002/0112042 A1 | 8/2002 | Coburn, II et al. |
| 2002/0133273 A1 | 9/2002 | Lowrey et al. |
| 2005/0183421 A1* | 8/2005 | Vaynberg .............. F01K 25/08 60/641.8 |
| 2006/0182055 A1 | 8/2006 | Coffee et al. |
| 2007/0063029 A1 | 3/2007 | Brandt et al. |
| 2007/0208436 A1 | 9/2007 | Das et al. |
| 2007/0268128 A1 | 11/2007 | Swanson et al. |
| 2008/0033600 A1 | 2/2008 | Norbeck |
| 2008/0147571 A1 | 6/2008 | Greiner et al. |
| 2009/0170537 A1 | 7/2009 | Mauti, Jr. |
| 2010/0100279 A1 | 4/2010 | Silvester |
| 2010/0135187 A1 | 6/2010 | Kwark |
| 2010/0145629 A1 | 6/2010 | Botich et al. |
| 2011/0153052 A1 | 6/2011 | Pettibone et al. |
| 2012/0299828 A1 | 11/2012 | Grokop et al. |
| 2012/0303392 A1 | 11/2012 | Depura et al. |
| 2013/0185675 A1 | 7/2013 | Perry et al. |
| 2013/0207783 A1 | 8/2013 | Cruzado et al. |
| 2013/0298652 A1 | 11/2013 | Gillette, II |
| 2014/0070924 A1 | 3/2014 | Wenger et al. |
| 2014/0075362 A1 | 3/2014 | Gray et al. |
| 2015/0026622 A1 | 1/2015 | Roaldson et al. |
| 2015/0169922 A1 | 6/2015 | Krepel et al. |

OTHER PUBLICATIONS

Office Communication for U.S. Appl. No. 14/919,393 mailed on Apr. 5, 2016 (23 pages).
Office Communication for U.S. Appl. No. 14/448,960 mailed on Nov. 18, 2014 (25 pages).
Office Communication for U.S. Appl. No. 14/448,960 mailed on May 6, 2015 (32 pages).
Office Communication for U.S. Appl. No. 14/448,960 mailed on Jul. 23, 2015 (6 pages).
Office Communication for U.S. Appl. No. 14/449,936 mailed on Apr. 27, 2015 (9 pages).
Office Communication for U.S. Appl. No. 14/449,936 mailed on Oct. 21, 2015 (14 pages).
Office Communication for U.S. Appl. No. 14/449,936 mailed on Feb. 18, 2016 (5 pages).
Office Communication for U.S. Appl. No. 14/754,431 mailed on Feb. 23, 2016 (18 pages).
Office Communication for U.S. Appl. No. 14/448,960 mailed on Jul. 27, 2016, (37 pages).
Office Communication for U.S. Appl. No. 14/754,431 mailed on Aug. 4, 2016, (24 pages).
Office Communication for U.S. Appl. No. 14/449,936 mailed on Sep. 27, 2016, (17 pages).
Office Communication for U.S. Appl. No. 14/754,431 mailed on Oct. 20, 2016, (7 pages).
Office Communication for U.S. Appl. No. 14/919,393 mailed on Oct. 26, 2016, (7 pages).
Office Communication for U.S. Appl. No. 14/443,960 mailed on Nov. 15, 2016, ( 5 pages).

* cited by examiner

MODULAR POWER PLANTS FOR MACHINES

TECHNICAL FIELD

The present invention relates generally to power plants for machines, and more particular, but not exclusive, to modular combustion-electric hybrid power plants for machines, such as but not limited to industrial machines.

BACKGROUND

Combustion engines are often employed to directly power various commercial and industrial machines. Because engines are not typically easily swappable, such machines may be equipped with engines that are large enough to continuously provide the maximum or peak power for all expected applications of the machines. However, most applications for these machines require at most the peak power for a small duty cycle of the machine's operation. Thus, for many applications of the machine, the machine may be equipped with an engine that is larger and/or more powerful than is required for a significant fraction of the machine's operation.

Larger engines may be more costly to purchase and maintain than smaller engines. Furthermore, larger engines may produce more emissions. As such, larger engines are often regulated by stricter emission standards than those for smaller engines. For instance, a large non-road diesel engine that powers an industrial machine may be regulated by the "Tier 4" emission standards. During a significant portion of the machine's operation, a much smaller engine would be sufficient to supply the power required to operate the machine. Thus, a larger engine is only required for certain applications of the machine and/or a small duty cycle of the machine's operation. It is with respect to these considerations and others that the invention has been made.

DETAILED DESCRIPTION OF THE INVENTION

Figure 1A:
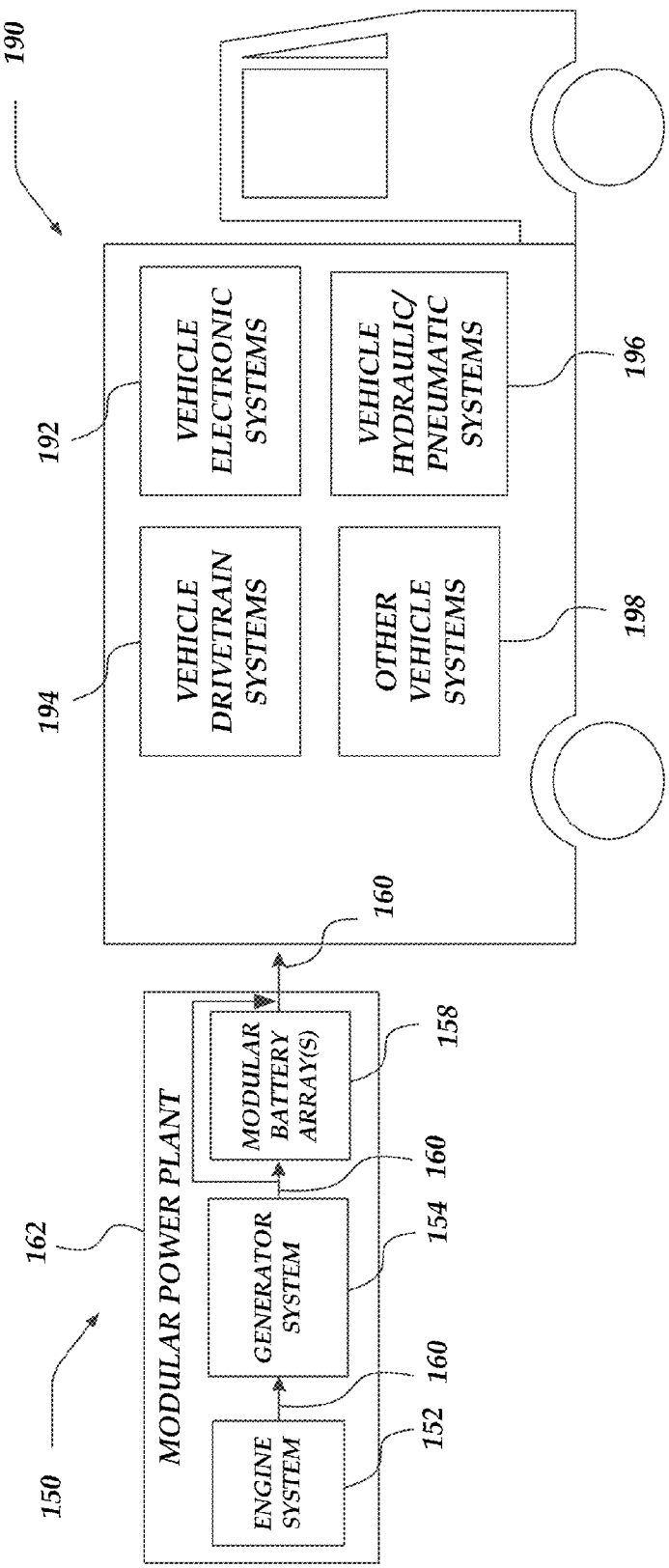
FIG. 1A shows a modular power plant that may be employed to power a mobile machine.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "machine" and "equipment" may refer to a collection, ensemble, system, or sub-system of components. The components may be modular components. A component may be a machine component. At least a portion of the components enable and/or provide various functions associated with the machine. Furthermore, the terms "machine," and "equipment" may refer to mechanical devices that can be used at a job site to perform actions. In at least one of various embodiments, the machine/equipment may be field-deployable, stationary, or mobile. Examples of machines or equipment includes, but are not limited to industrial or construction equipment or vehicles or various components thereof.

Machines/equipment may include virtually any system or subsystem that includes mechanical, electrical, hydraulic power systems, pneumatic power systems, or the like. As such, machines may be or include systems or sub-systems. In various embodiments, a machine may include a vehicle, such as but not limited to cars, trucks, tractors, and the like. Various non-limiting examples of machines include heavy equipment, such as but not limited to bulldozers, snowcats, excavators, backhoes, loaders, and the lack. A machine may include industrial and/or commercial equipment employed in various industries, including but not limited to construction, timber, agricultural, mining, road paving, and the like.

Any of the machines discussed herein may include machine components, such as but not limited to engines, motors, pumps, pistons, valves, winches, gearboxes, power units, manifolds, filters, cylinders, actuators, accumulators, lubrication systems/components, control devices such as joysticks, or other mechanical/hydraulic/pneumatic devices that have characteristics that can be monitored by one or more sensors. As discussed further below, machines or equipment may be powered by a modular power plant. Furthermore, machines or equipment may be remotely configured, monitored, controlled, and/or at least partially maintained by one or more collection computers in communication, via a network, with the machine.

As used herein, the term "engine" may refer to a machine that converts chemical energy into mechanical energy. The chemical energy may be stored within a fuel, such as but not limited to gasoline, petrol, diesel, natural gas, propane, wood, coal, bio-mass, or any other material that stores energy within chemical bonds. The fuel may be in a solid, liquid, or gas phase. The chemical energy within the fuel may be stored by the chemical bonds between the molecules and/or atoms of the fuel. Within an engine, the fuel may undergo a chemical process to release at least a portion of the energy stored within the fuel. The chemical process may be an exothermic process, such as but not limited to combustion. The chemical process may break or disassociate at least a portion of the bonds of the molecules and/or atoms within the fuel to release thermal energy. As such, an engine may convert the energy stored in the fuel into heat. An engine converts the released heat into mechanical energy, such as but not limited to rotational, translational, and/or vibrational energy. In various embodiments, an engine may include an internal or an external combustion engine.

As used herein, the term "battery" may refer to a machine, component, apparatus, or any device that at least temporally stores electric or electrical energy. A battery may include at least two terminals, wherein an electrical potential exists between the two terminals. As used herein, the term "motor" may refer to a machine that converts electrical energy into mechanical energy, such as but not limited to rotational, translational, and/or vibrational energy. The electrical energy may be stored within one or more batteries. In various embodiments, a motor may include an electric and/or electrical motor. As used herein, the term "generator" may refer to a machine that converts mechanical energy into electrical energy.

As user herein, the term "power bus" may refer to any system, subsystem, component, or architecture that transmits energy or power between any two machine or power plant components, systems, or subsystems. The transmitted energy or power may be any form of energy or power, including but not limited to mechanical energy, electrical energy, optical energy, or the like. For instance, at least portions of a power bus may transmit mechanical energy via the transmittance of translation, rotation, or vibration between components or systems included in a machine or a power plant. Thus, a power bus may include a drive shaft, a chain, a belt, a crank shaft, a vibrational body such as a spring or elastomer, a mechanical waveguide, or any such element. At least portions of a power bus may transmit electrical energy via the transmittance of electrical signal that includes at least electric current and/or voltage. Thus, a power bus may include cabling, wires, conductors, waveguides, and the like. A power bus may transmit optical power. A power bus may transmit information via a data signal.

As used herein, the term "collection computer" may refer to a network computer device that can identify, configure, monitor, control, and manage the maintenance of one or more collections of components, such as a machine. A collection computer may identify machine and/or power plant components. The machine and/or power plant components may include ID Tags and sensors that provide machine and/or power plant data to the collection computer over a network. The collection computer may automatically identify each component via the ID Tags, as well as collect sensor data from the sensors.

The data may be transmitted to another network computer. In some embodiments, a collection computer may be referred to as a collection node. In various embodiments, a collection computer may store at least some of the collected data. In other embodiments, the collection computer may transmit at least some of the collected data to a remote server computer. In various embodiments, a user may be enabled to customize the collection computer by selecting which sensors to collect, store, and/or transmit data. Because a collection computer at least partially enables the remote control of a machine, a collection computer may be a controller computer. Furthermore, because a collection computer at least partially enables the management of a machine, a collection computer may be a manager computer. In various embodiments, a collection computer is a collection server computer.

As used herein, the terms "Identification Tag," "ID Tag," and "Tag" may refer to a readable device that includes identifying information or data regarding a component. The identifying information may be uniquely identifying information, such that at least one of a component type, version, manufacturing traceability, component specifications, and the like may be determined from reading or interrogating the ID Tag. In addition to identifying a type of component, information stored in the ID Tag may uniquely identify the specific instance of the component. For instance, a unique serial number may be stored in each ID Tag that uniquely identifies the component. Thus, both component type and specific instances of components may be tracked via the identifying information stored in the ID Tag.

ID Tags include non-volatile memory to store information pertaining to the corresponding part. Various, but non-limiting, examples of non-volatile memory include read-only memory, FLASH memory (NAND or NOR), ferroelectric (Fe) random-access memory (RAM), magnetic RAM, phase-change memory (PCM or PCRAM), erasable programmable read only memory (ROM) (EPROM), electrically erasable programmable read only memory (EEPROM), and the like. Embodiments of PCM include chalcogenide memory and the like. In at least one embodiment, ID Tags include an integrated circuit (IC) that includes onboard FLASH memory that stores the pertinent information regarding the corresponding component.

In preferred embodiments, an ID Tag is a radio-frequency ID (RFID) Tag. When read, an RFID TAG may wirelessly provide, via electromagnetic fields, the information embedded or encoded within the Tag. A Tag may electronically store the information. A Tag may be powered via electromagnetic induction that is induced by an interrogating or reading device. In other embodiments, the Tag may be powered via an internal power source, such as a battery.

An ID Tag may be included in one or more components included in a machine. For instance, at least one ID Tag may be mounted directly on, on integrated with, or otherwise connected to at least one component included in a collection of components, i.e. a machine. Information regarding the associated or corresponding component may be determined by wirelessly reading and/or interrogating the ID Tag. In preferred embodiments, at least a portion of the ID Tags included in a collection of components are in communication with one or more manger computers. A collection computer may automatically determine information regarding the collection of components based on the information provided by the one or more ID Tags. In preferred embodiments, one or more collection computers may enable the automatic identification of at least a machine type associated with the machine based on the information stored in the machine component ID Tags. The collection computer may further enable the automatic configuration of the machine based on at least the information provided by the one or more ID Tags.

As used herein, the term "sensor" may refer to a device that measures at least one characteristic of a machine and/or equipment. Examples of machine/equipment characteristics may include, but are not limited to, current load, current component movement/motion (e.g., a conveyer belt), hydraulic pressure, bearings, GPS location, gearbox temperature, hydraulic temperature, engine PRMs, vehicle speed, coolant temperature, engine coolant level, engine coolant pressure, engine oil temperature, engine oil level, engine oil pressure, engine fuel consumption rate, instantaneous fuel economy, average fuel economy, total average fuel economy, total fuel used, total engine idle hours, total engine idle fuel used, total engine hours of operation, fuel level, or the like. Examples of sensors may include, but are not limited to, pressure sensors, temperature sensors, load cells, revolutions per minute sensors, fluid level sensors, consumption or flow rate sensors, running time, idle time, location sensors (e.g., GPS), video cameras, still image cameras, motion sensors, humidity sensors, moisture sensors, vibration sensors, sound/acoustic sensors, or the like.

In some embodiments, the sensor may be mounted to, integrated with, or otherwise connected to components within the configured, monitored, and managed collection of components, i.e. the machine or equipment. In various embodiments, one or more sensors may be in communication with one or more collection computers. In some embodiments, each sensor may include or be connected to a controller that can convert signals received from the sensor into messages or other data formats that can be recognized and understood by the collection computer. In one non-limiting example, sensors may be in communication or connected to a collection computer by a controller area network (CAN), a National Marine Electronics Association (NMEA) 2000 network, an Aircraft Data Network (ADN), and the like. The network sensors may be identified by a corresponding CAN, NMEA 2000 or ADN identifier (e.g., a source address, unique sensor identifier, or the like).

As used herein, the term "template" may refer to a report or graphical representation of at least ID Tag or sensor data. Templates may be predetermined and/or generated, created by a user, modified by a user, or the like. Each template may include one or more gauges, charts, graphs, maps, or other visualizations to represent ID Tag and sensor data, which can be customized by a user. A template may also indicate a machine type, such as a hydraulic pump, or the like, for a machine that is automatically identified by the parts included in the machine. Furthermore, a template may also indicate a specific instance of a machine. Such indications of specific instances of machines may include unique serial numbers, licenses numbers, or the like. Templates may also include features to visually represent data obtained via the interrogation of ID Tags and sensors. In various embodiments, a user may be enabled to select which ID Tags and sensors to view corresponding ID Tag and sensor data. In other embodiments, the ID Tags and/or sensors may be automatically selected for a template based on a machine being automatically configured and/or monitored, the ID Tags and sensors providing real-time data, historical data stored at the server, or the like.

Briefly stated, embodiments are directed towards modular power plants that may be employed to provide power required to operate one or more machines. A power plant may be a combustion-electric hybrid power plant that includes at least one or more engines, one or more generators, and one or more battery arrays. The battery arrays include one or more modular batteries. Rather than the engine directly providing power to the machine, the engine and generators are employed to charge the batteries. The charged batteries or the combination of the charged batteries and the one or more generators provide the power required to operate the machine. The power provided to the machine may include any type of energy, including but not limited to electrical or mechanical energy.

Various embodiments automatically identify the machine and/or the power plant. In some embodiments, identifying a machine includes identifying a machine type based on the combination of components included in the machine. For instance, the machine type may be based on an amount and/or type of the components coupled to the machine. Some embodiments determine the geo-location of the machine. Minimum and maximum thresholds for the electrical energy that the batteries may provide to the machine to the machine may be dynamically determined. The thresholds may be based on the identified machine type, the geo-locations, or the peak amount of electrical energy that is currently available from the batteries.

A user may vary the maximum power output of the power plant by varying the number and/or type of modular batteries included in the one or more battery arrays. The peak amount of electrical energy that is available from the batteries may be based on at least how many batteries are included in the arrays, the types of batteries, and a charge level of the batteries. The specific configuration of the batteries may be based on the power requirements of the machine's expected usage or operation. Accordingly, the power plant may be configured to a specific machine application by installing and/or removing batteries from the battery arrays based on the power requirements for the specific machine application.

The machines may be mobile machines, such as but not limited to passenger vehicles, earthmovers, forklifts, cement mixers, and the like. Some machines may be non-mobile machines, such as but not limited to hydraulic presses, cranes, robots, and the like. Various embodiments of power plants are integrated with a modular skid that is installed on the machine. The battery arrays may be configured prior to or post installing the skid on the machine. The configuration of the battery arrays may be varied to compensate for variances in the usage of the machine, including but not limited to the expected peak power requirements of the machine.

Because the batteries provide at least a portion of the power to the loads of the machine, the power output of the engine may be held substantially constant as the machine loads fluctuate during the operation of the machine. As such, when providing mechanical energy to the one or more generators, the one or more engines may be operated at a substantially constant rate that is optimized for the efficiency of the engines. Accordingly, employing the various embodiments of power plants described herein to power a machine may enable the operation of machines that are more efficient than machines that are powered directly via engines. In some machines that are provided operating power directly from an engine, the operating speed of the engine fluctuates with the fluctuating machine loads.

The power plant may provide power to any electrical, mechanical, hydraulic, pneumatic, or any other systems included in the machine. For instance, the electrical energy stored within the batteries may power a drivetrain of a vehicle to propel the vehicle through its environment. The power plant may power a pneumatic lift included in the vehicle, a hydraulic pump included in the vehicle, one or more computers included in the vehicle, or any other machine component that requires power for its operation.

For the various embodiments described herein, the one or more battery arrays may be configured for each usage, operation, or application of the machine based on the expected usage of the machine in a particular application, where the expected usage includes at least the expected peak power requirements of the machine's application. Configuring the one or more battery arrays may include varying the number and/or types of batteries included in the one or more battery arrays. The one or more battery arrays may be configured based on at least one of the machine's expected peak power requirements, the machine's application, the machine's location, or other such factors. Due to the modular nature of the batteries, for each usage and/or application of the machine, the battery array may be configured based on the peak power requirements of the expected usage. As such, the battery array may be configured (or sized) based on a particular expected usage and/or operation.

Because the batteries may at least temporarily store, at least for a finite period of time, at least a portion of the energy generated by the engine, the batteries may provide the machine a greater amount of power than engine is able to generate. Accordingly, the engine included in the power plant may be smaller than an engine that is otherwise required to provide the expected peak power directly to the machine. In contrast to equipping the machine with a larger engine that is able to service the peak power requirements for a variety of potential machine usages, the various embodiments may be equipped with a smaller engine. For a particular application of the machine, the battery arrays are configured based on the peak power requirements of the particular application. Accordingly, the battery arrays are re-sized for the peak power requirements of each particular application, rather than sizing the engine for the most extreme power requirements of a large variety of potential applications.

Due to the modular nature of the batteries, the power plant may easily be scaled up or down to power the machine in a wide range of mobile and non-mobile applications by configuring the one or more battery arrays. Each battery may be easily installed and coupled to a power bus of the one or more battery arrays.

The power plant may further include a heating, ventilating, and air conditioning (HVAC) system to control the environment within one or more cabins or chambers included in the machine. Controlling the environment of a cabin may include controlling the air temperature, air pressure, airflow, and the like within the cabin. Various embodiments may include an onboard cooling system to cool the engine.

A power plant may include a modular skid or a frame. Modular power plant components may be integrated with the skid, such that the power plant is a single, integrated unit that may be installed on or within the machine. In various embodiments, the power plant is mechanically and/or electrically coupled to the machine. In some embodiments where the machine is a mobile machine, the power plant is a mobile power plant that travels with the machine.

The power plant may include a one or more power busses that enable providing the power to the machine. The power busses may electrically couple the one or more generators and/or the one or more battery arrays to various power busses, components, and/or systems/subsystems of the machine. In various embodiments, the one or more power busses may be implemented via one or more wiring harnesses included in the power plant and integrated with the skid. In at least one embodiment, a skid with a particular footprint may be employed and installed on a variety of machine types. Accordingly, a single power plant may be configured for and installable on multiple machine types. For instance, power plant may configured for and installed on a dump truck. After powering the dump truck, the power plant may be configured for and installed on a forklift. The power plant integrated on the skid may be automatically or manually configured based on the machine type. Accordingly, the power plant and the skid may be separately maintained.

Furthermore, various embodiments of machines discussed herein may be automatically identified, configured, monitored, controlled, managed, and/or at least partially maintained via one or more collection computers, in communication via a network with the machine's components. The automatic identification, configuration, monitoring, controlling, and maintaining of a machine may be based on at least collection computers, machine readable ID Tags and sensors associated with the machine components. As such, a machine's type, location, application, expected usage, expected peak power requirements, and the like may be determined based on at least the collection computer, ID Tags, sensors, and the like. The modular power plant may be configured for one or more applications based on the automatic identification, configuration, monitoring, controlling, and maintaining of the machine. A modular power plant may also include one or more collection computers and at least a portion of the various components included in the modular power plant may include various ID Tags and/or sensors. As such, a power plant may at least be partially identified, configured, monitored, controlled, managed, and/or maintained via one or more collection computers, ID Tags, and sensors.

A Modular Power Plant

FIG. 1A shows a modular power plant 150 that may be employed to power a machine, such as truck 190. Various embodiments of power plants discussed herein may include more or less components than power plant 150 shown in FIG. 1A. Embodiments are directed towards modular power plants, including but not limited to power plant 150 of FIG. 1A, that may be employed to provide power required to operate one or more machines, such as but not limited to truck 190. In at least one embodiment, truck 190 does not include an engine, a motor, or other power generating components. Rather, the components that provide power to truck 190 are included in power plant 150.

Engine system 152 includes at least one or more engines. At least a portion of power bus 160, such as a driveshaft, belt, chain, or the like, couples the one or more engines to at least one alternating current (AC) generator that is included generator system 154. This coupling transmits, or provides, at least a portion of the mechanical energy generated by the one or more engines to the one or more AC generators. The AC generators convert at least a portion of the engine's mechanical energy into electrical energy. The power bus 160 may transmit, or provide a portion of the this electrical energy, via an AC power signal, to the machine to power the machine's operation. The power bus 160 transmits at least another portion of the electrical energy to the modular battery arrays 158 and charges the one or more batteries included in the batter arrays 158. When at least partially charged, the batteries at least temporarily store at least a portion of the electrical energy. The power bus 160 provides at least a portion of the electrical energy generated via generator system 154 and/or electrical energy stored in the batteries to the vehicle systems, such as but not limited to systems 192/194/196/198. When the power plant 150 is integrated onto skid 162, the skid 162 may be installed on truck 190 via mounts, couplers, or fasteners, such as but not limited to bolts and the like More specifically, a power plant, such as but not limited to power plant 150, may be a combustion-electric hybrid power plant that includes at least one or more engines, one or more generators, and one or more battery arrays. The battery arrays include one or more modular batteries. One or more of the included batteries may be bundled into one or more battery packs. Rather than the engine directly providing power to the machine, the batteries or the combination of the batteries and the one or more generators provide power required to operate the machine. A user may vary the maximum power output of the power plant by varying the number and/or type of modular batteries included in the one or more battery arrays. The specific configuration of the batteries may be based on the power requirements of the machine's expected usage or operation. Accordingly, the power plant may be configured to a specific machine application by installing and/or removing batteries from the battery arrays based on the power requirements for.

The machines may be mobile machines, such as but not limited to truck 190, passenger vehicles, earthmovers, forklifts, cement mixers, and the like. Some machines may be non-mobile machines, such as but not limited to hydraulic presses, cranes, robots, and the like. Various embodiments of power plants are integrated with a modular skid that is installed on the machine. The battery arrays may be configured prior to or post installing the skid on the machine. The configuration of the battery arrays may be varied to compensate for variances in the usage of the machine, including but not limited to the expected peak power requirements of the machine.

As discussed herein, modular power plant 150 may include and be integrated onto a skid 162, which may be installed on truck 190. Power plant 150 is a hybrid power plant that includes an engine system 152, a generator system 154, one or more modular battery arrays 158, and a power bus 160. Power plant 150 may include similar features to power plant 500 of FIG. 5 and/or power plant 600 of FIG. 6. As such, engine system 152 may include similar features to engine system 502 of power plant 500, generator system 154 may include similar features to generator system 504 of power plant 500, and modular battery arrays 158 may include similar features to modular battery arrays 508 of power plant 500. Power bus 160 may be coupled to one or more systems of truck 190, such as but not limited to vehicle drivetrain systems 194, vehicle electronic systems 912, vehicle hydraulic/pneumatic systems 196, and other vehicle systems 198. Power bus 160 may transmit, or provide, power to the vehicle systems.

One or more engines included in engine system 152 convert, via combustion of a fuel, energy stored within the chemical bonds of the fuel into mechanical energy. One or more AC generators, included in generator system 154, convert the mechanical energy into electrical energy. In some embodiments, during the operation of a machine, at least a portion of the electrical energy generated by the one or more generators may be provided to the machine to power the operation of the machine. Portions of the electrical energy that are not required for the operation of the machine may be provided to and at least temporarily stored in the one or more batteries included in one or more modular battery arrays, such as but not limited to battery arrays 158 of power plant 150.

Accordingly, portions of the electrical energy may be employed to power the operation of the machine and other portions are at least temporarily stored within the one or more batteries. In at least one embodiment, during the operation of the machine, at least a portion of the mechanical energy generated by the one or more engines is directly provided to the machine to power the operation of the machine.

In some embodiments, during the operation of the machine and when the power generated by the one or more engines/generators is sufficient to power the machine, the machine is powered via the electrical power provided via the one or more generators. When the operation of the machine exceeds the power provided via the one or more generators, the one or more batteries provide the machine additional power, via the electrical energy stored within the batteries. Accordingly, the one or more batteries may provide the difference in power between the machine's real-time power requirements and the power output by the engines/generators. Thus, the configured battery arrays provide the difference in power between the power output by the engines/generators and the peak power requirements for a specific application of the machine.

In at least one embodiment, the one or more battery arrays continually provide the required power to operate the machine, without the one or more generators directly providing power to the machine. In such embodiments, when the batteries are providing power for the operation of the machine, the generators may continuously charge the one or more batteries. The one or more, at least partially charged batteries may continuously provide the power required to operate the machine.

Because the batteries provide at least a portion of the power to the loads of the machine, the power output of the engine may be held substantially constant as the machine loads fluctuate during the operation of the machine. As such, when providing mechanical energy to the one or more generators, the one or more engines may be operated at a substantially constant rate that is optimized for the efficiency of the engines. Accordingly, employing the various embodiments of power plants described herein to power a machine may enable the operation of machines that are more efficient than machines that are powered directly via engines. In some machines that are provided operating power directly from an engine, the operating speed of the engine fluctuates with the fluctuating machine loads.

The power plant may provide power to any electrical, mechanical, hydraulic, pneumatic, or any other systems included in the machine. For instance, the electrical energy stored within the batteries may power a drivetrain of a vehicle to propel the vehicle through its environment. The power plant may power a pneumatic lift included in the vehicle, a hydraulic pump included in the vehicle, one or more computers included in the vehicle, or any other machine component that requires power for its operation. As such, power plant 150 may provide power to at least one of vehicle drivetrain systems 194, vehicle electronic systems 192, vehicle hydraulic/pneumatic systems 196, and/or other vehicle systems 198 of truck 190.

In contrast to machines that are powered directly from the mechanical energy generated by a combustion engine, the various machines discussed herein are powered via electrical energy provided by the one or more generators and/or stored in the one or more batteries. By employing one or more generators, the engine charges the batteries. The batteries in turn store at least a portion of the mechanical energy generated by the engine in the form of electrical energy. Because the batteries are modular, a battery may easily be installed and removed from a battery array. Accordingly, the one or more battery arrays may be configured based on the machine's expected usage and/or operation requirements, including at least the expected peak power requirements.

Many machines that are powered directly from an engine are equipped with a combustion engine that is sized for the expected peak power requirements of the machine for many different machine applications. In contrast, for the various embodiments described herein, the one or more battery arrays may be configured for each usage, operation, or application of the machine based on the expected usage of the machine in a particular application, where the expected usage includes at least the expected peak power requirements of the machine's application. Configuring the one or more battery arrays may include varying the number and/or types of batteries included in the one or more battery arrays. The one or more battery arrays may be configured based on at least one of the machine's expected peak power requirements, the machine's application, the machine's location, or other such factors. Due to the modular nature of the batteries, for each usage and/or application of the machine, the battery array may be configured based on the peak power requirements of the expected usage. As such, the battery array may be configured (or sized) based on a particular expected usage and/or operation.

Because the batteries may at least temporarily store, at least for a finite period of time, at least a portion of the energy generated by the engine, the batteries may provide the machine a greater amount of power than engine is able to generate. Accordingly, the engine included in the power plant may be smaller than an engine that is otherwise required to provide the expected peak power directly to the machine. In contrast to equipping the machine with a larger engine that is able to service the peak power requirements for a variety of potential machine usages, the various embodiments may be equipped with a smaller engine. For a particular application of the machine, the battery arrays are configured based on the peak power requirements of the particular application. Accordingly, the battery arrays are re-sized for the peak power requirements of each particular application, rather than sizing the engine for the most extreme power requirements of a large variety of potential applications.

A smaller engine may reduce the overall costs and simplify the maintenance of the machine. In some embodiments, the engine may be a gasoline-powered engine that charges the batteries during the operation of the machine. Less restrictive emission regulations may be associated with a smaller, rather than larger engine. For instance, power plant 150 may include a gasoline-powered 50 horsepower (hp) engine, which does not invoke "Tier 4" emission requirements, may be employed in the power plant. In other embodiments, the engine included in power plant 150 may be powered by other fuels, including but not limited to diesel, natural gas, propane, coal, and the like.

Due to the modular nature of the batteries, the power plant may easily be scaled up or down to power the machine in a wide range of mobile and non-mobile applications by configuring the one or more battery arrays. Each battery may be easily installed and coupled to a power bus of the one or more battery arrays. A battery may be of any battery type, including but not limited to lithium-ion (Li-ion), nickel-cadmium (NiCd), nickel-zinc (NiZn), and the like.

The power plant may further include a heating, ventilating, and air conditioning (HVAC) system to control the environment within one or more cabins or chambers included in the machine. Controlling the environment of a cabin may include controlling the air temperature, air pressure, airflow, and the like within the cabin. Various embodiments may include an onboard cooling system to cool the engine.

Each of the components included in the power plant may be a power plant component. Likewise, each of the components included in a machine may be a machine component. A power plant may include a modular skid or a frame. Modular power plant components may be integrated with the skid, such as but not limited to skid 162 of power plant 150. In such embodiments, the power plant is a single, integrated unit that may be installed on or within the machine. In various embodiments, the power plant may be mechanically and/or electrically coupled to the machine. In some embodiments where the machine is a mobile machine, the power plant is a mobile power plant that travels with the machine. A power plant may be shipped through standard shipping means to multiple locations of various machines.

The power plant may include a one or more power busses, such as but not limited to power bus 160 of power plant 150, that enable providing power to the machine. The power busses may electrically couple the one or more generators and/or the one or more battery arrays to various power busses, components, and/or systems/subsystems of the machine. For instance, power bus 162 may be enabled to provide power to at least one of vehicle drivetrain systems 194, vehicle electronic systems 192, vehicle hydraulic/pneumatic systems 196, and/or other systems 198 of truck 190.

In various embodiments, the one or more power busses may be implemented via one or more wiring harnesses included in the power plant and integrated with the skid. In at least one embodiment, a skid with a particular footprint may be employed and installed on a variety of machine types. Accordingly, a single power plant may be configured for and installable on multiple machine types. For instance, power plant may configured for and installed on a dump truck. After powering the dump truck, the power plant may be configured for and installed on a forklift. The power plant integrated on the skid may be automatically or manually configured based on the machine type. Accordingly, the power plant and the skid may be separately maintained.

Furthermore, various embodiments of machines discussed herein may be automatically identified, configured, monitored, controlled, managed, and/or at least partially maintained via one or more collection computers, in communication via a network with the machine's components. The automatic identification, configuration, monitoring, controlling, and maintaining of a machine may be based on at least collection computers, machine readable ID Tags and sensors associated with the machine components. As such, a machine's type, location, application, expected usage, expected peak power requirements, and the like may be determined based on at least the collection computer, ID Tags, sensors, and the like. The modular power plant may be configured for one or more applications based on the automatic identification, configuration, monitoring, controlling, and maintaining of the machine. U.S. patent application Ser. No. 14/754,431, entitled "MODULAR CONTROL SYSTEM," filed on Jun. 29, 2015, the contents of which are hereby incorporated by reference, discusses various embodiments of the automatic identification, configuration, monitoring, controlling, and maintaining of a machine.

Similar to the various embodiments discussed in U.S. patent application Ser. No. 14/754,431, a modular power plant may include one or more collection computers and at least a portion of the various components included in the modular power plant may include various ID Tags and/or sensors. As such, a power plant may at least be partially identified, configured, monitored, controlled, managed, and/or maintained via one or more collection computers, ID Tags, and sensors Additionally, various embodiments of a modular power plant may be configured for one or more machine applications based on at least one of analytics or marketplace data for the machine and/or the power plant. The analytics and/or marketplace data may be generated by a user community. U.S. patent application Ser. No. 14/919,393, entitled "USER COMMUNITY GENERATED ANALYTICS AND MARKETPLACE DATA FOR MODULAR SYSTEMS," filed on Oct. 21, 2015, the contents of which are hereby incorporated by reference, discusses various embodiments of user community generated analytics and marketplace data for some embodiments of machines discussed herein.

The various embodiments of the machines and modular power plants may be employed in rental lots. A customer may rent a machine and a power plant that are configured for a specific usage or application. The allowed operation or usage of the machine may be included in a rental agreement between a customer and a party that operates the rental lot. Before leaving the rental lot, the power plant may be configured with a specific number of batteries appropriate for the customer's requirements and/or the terms of the rental agreement. The rental price may be based on the number or types of batteries included in the battery array and/or connected to the power plant's power bus. As such, the customer may be prohibited from operating the machine beyond conditions specified in the rental agreement. Because additional batteries are required to operate the machine beyond the terms of the rental agreement, the machine may not be operated beyond the agreed upon terms.

Furthermore, batteries that are installed in the battery array, such as but not limited to modular battery array 158 of power plant 150 may be connected and disconnected from the power bus of the power plant via one or more switches. The switches may be operated remotely, over a communication network. Because the configuration and operation of the machine may be monitored remotely, the switches may be operated remotely to remotely and/or automatically vary the configuration of the power plant. The rental agreement may dictate that a machine may only be operated under certain conditions, such as within a predetermined time-period, for a total amount of accumulated time, within a predetermined geo-location, or for only performing certain tasks. By employing various embodiments discussed herein, including at least systems and methods discussed in U.S. patent application Ser. No. 14/754,431 and U.S. patent application Ser. No. 14/919,393, the machine and the power plant may be remotely monitored and/or controlled. After the terms of the rental agreement are exceeded, at least a portion of the batteries may be remotely disconnected from the power bus, via the switches, such that the operation of the machine is limited or restricted to within a subset of its capabilities.

Illustrated Operating Environment

Figure 1B:
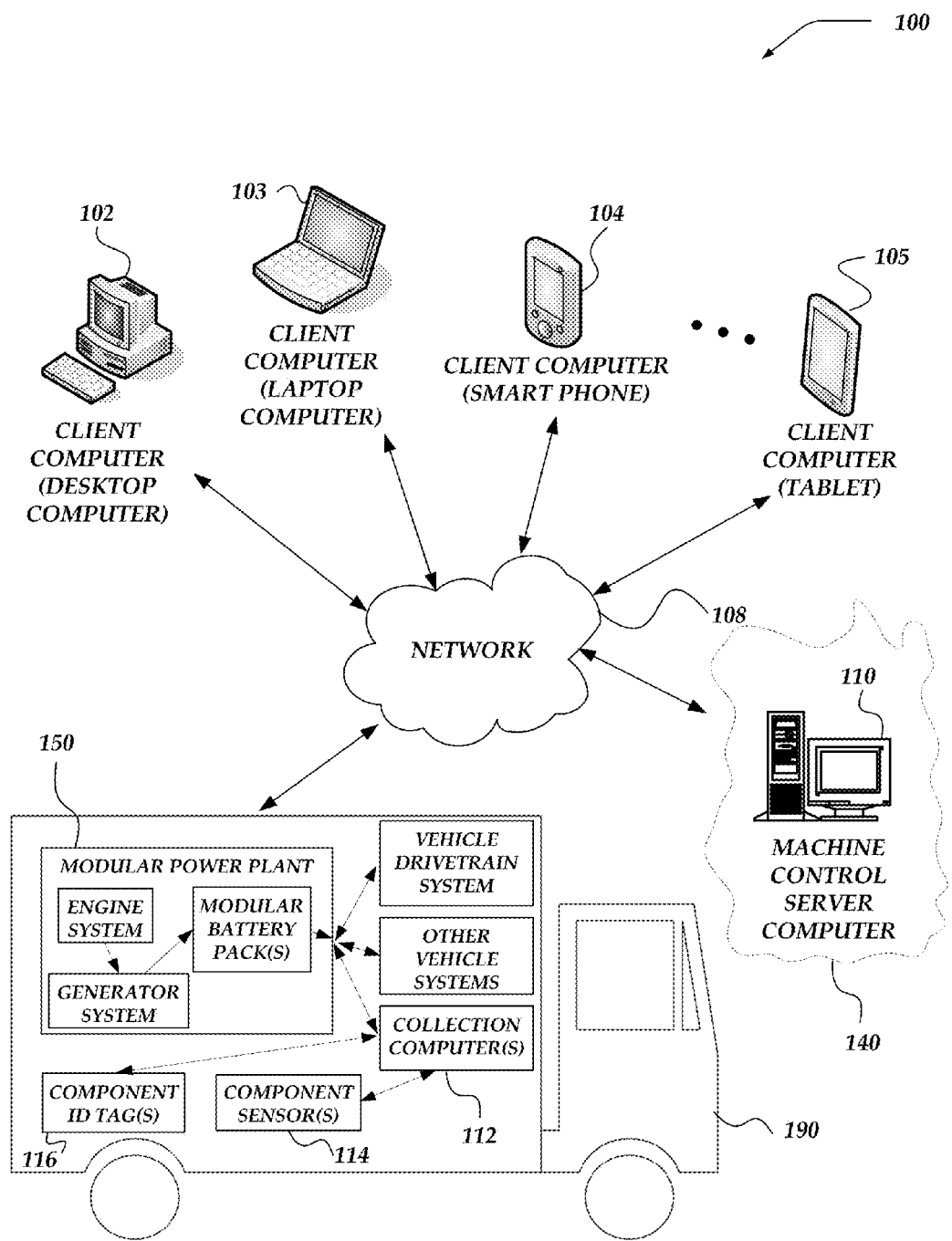
FIG. 1B is a system diagram of an environment in which embodiments of the invention may be implemented.

FIG. 1B shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1B may include modular power plant 150 and truck 190 of FIG. 1A. The modular power plant 150 may be installed in truck 190.

System 100 may also include machine control server computer (MCSC) 110, client computers 102-105, collection computer(s) 112, component sensor(s) 114, component ID Tags 116, and network 108. At least a portion of the collection computer(s) 112, component sensor(s) 114, and component ID Tags 116 may be included in modular power plant 150. In some embodiments, at least a portion of the collection computer(s) 112, component sensor(s) 114, and component ID Tags 116 may be included in truck 190. In various embodiments, machine components included in truck 190 include one or more component sensors 114 and/or one or more component tags 116. Truck 190 may include one or more collection computers 112. Similarly, power plant components included in power plant 150 may include one or more component sensors 114 and/or one or more component tags 116. Power plant 150 may include one or more collection computers 112.

In various embodiments, system 100 includes a machine-managing platform 140. Machine-managing platform 140 may include one or more server computers, such as but not limited to MCSC 110. Furthermore, platform 140 may include one or more instances of client devices, including but not limited to any of client devices 102-105. Platform 140 may include one or more collection computers, such as collection computer 112 or and other network computer. Although not shown, platform 140 may include one or more data storage devices, such as rack or chassis-based data storage systems. Any of the databases discussed herein may be at least partially stored in data storage devices within platform 140. As shown, any of the network devices, including the data storage devices included in platform 140 are accessible by other network devices, via network 108.

At least one embodiment of client computers 102-105 is described in more detail below in conjunction with client computer 200 of FIG. 2. Briefly, in some embodiments, client computers 102-105 may be configured to communicate with collection computers 112, MCSC 110 and/or other network computers. In various embodiments, client computers 102-105 may be enabled to access, interact with, and/or view user interfaces and reports provided by MCSC 110, such as through a web browser. In at least one of various embodiments, a user of a client computer may be enabled to manipulate, configure, and/or customize the machine configuration, monitoring, controlling, maintenance, and reporting services proved by MCSC 110. The user of a client computer may also configure a template.

In at least one of various embodiments, client computers 102-105 may be enabled to receive alerts if an alert condition is satisfied by at least one sensor. Similarly, client computers 102-105 may be enabled to communicate (e.g., via a Bluetooth or other wireless technology, or via a USB cable or other wired technology) with collection computers 112, such as to configure a collection computer in which ID Tag and sensor data may be collected by the collection computer 112, stored at the collection computer 112, and/or transmitted to MCSC 110. In some embodiments, at least some of client computers 102-105 may operate over a wired and/or wireless network to communicate with other computing devices, collection computers 112, or MCSC 110. Generally, client computers 102-105 may include computing devices capable of communicating over a network to send and/or receive information; perform various online and/or offline activities, or the like. It should be recognized that embodiments described herein are not constrained by the number or type of client computers employed, and more or fewer client computers—and/or types of client computers—than what is illustrated in FIG. 1B may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but is not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of MCSC 110 is described in more detail below in conjunction with machine control server computer 300 of FIG. 3. Briefly, in some embodiments, MCSC 110 may be operative to communicate with client computers 102-105 to enable users of client computers 102-105 to view, access, and/or manipulate ID Tag and sensor data stored/maintained by MCSC 110. In various embodiments, MCSC 110 may communicate with one or more collection computers 112 to configure the collection computer 112, receive sensor data and ID Tag data from the collection computer, or the like, included in at least one of truck 190 and/or power plant 150. In some embodiments, MCSC 110 may maintain one or more templates which can be generated, modified, and/or customized based on ID Tag and/or sensor data transmitted from a collection computer 112 and/or based on input by a user (e.g., a user's selection of one or more ID Tags or sensors).

In some embodiments, MCSC 110 may monitor the ID Tag and/or sensor data to determine if an alert condition is satisfied (e.g., a temperature value exceeding a threshold value). If an alert condition is satisfied, then an alert may be provided to one or more users (e.g., users of client computers 102-105). In other embodiments, the usage of the machine may be limited based on ID Tag or sensor data. MCSC 110 may perform predictive analysis on ID Tag data to determine a machine type. MCSC 110 may perform predictive analysis on sensor data to determine patterns in the sensor data to predict component failures. In some embodiments, the predictive analysis may be performed based on ID Tag and sensor data from a plurality of separate machines (which may or may not be operated by a same customer). Any of the analyses provided by MCSC 110 may incorporate geo-data to inform such predictions. The geo-data may be provided by GPS transceivers included in the machine, in the components, in the collection computer 110, the MCSC 110, and of the client devices 102-105, or the like.

Furthermore, MCSC 110, or another device included in platform 140, may receive, provide, manage, integrate, and collect various user or crowd-sourced or social network data as discussed throughout. MCSC 110 may generate, update, and manage any of the predictive analyses or crowd-sourced or social network heuristics discussed herein. Likewise, MCSC 110, or another device included in platform 140, may receive, provide, manage, integrate, and collect data originating from machine and component suppliers, vendors, and manufacturers, including but not limited to component specification and reliability data. MCSC 110 may receive, provide, manage, integrate, aggregate, and collect marketplace or electronic commerce (e-commerce) data.

In some embodiments, collection computer 112 is a collection server computer. Various embodiments of collection computers are described in more detail below in conjunction with collection server computer 400 of FIG. 4. Briefly, in some embodiments, collection computer 112 may monitor and/or collect sensor data from one or more sensors 114. Collection computer 112 also collects ID Tag data from one or more ID Tags 116. In some embodiments, collection computer 112 may store at least some of the ID Tag and sensor data locally on collection computer 112. In other embodiments, collection computer 112 may transmit at least some of the ID Tag and sensor data to MCSC 110. In various embodiments, the data that is collected, stored, and/or transmitted may be configured by a user of client computers 102-105 and/or a user of MCSC 110. In some embodiments, collection computer 112 may monitor the sensor data to determine if an alert condition is satisfied, and may provide one or more alerts to one or more users based on the alert condition. In other embodiments, collection computer 112 may perform any of the predictive analyses, such as those based ID Tag and sensor data to predict machine type, machine configurations, component failures, and the like, similar to that of MCSC 110.

In some embodiments, the ID Tag or sensor data collected by collection computer 112 may be based on a list of ID Tags and sensors in communication with the collection computer 112. In at least one of various embodiments, this list may be determined/defined by a user. In another embodiment, the list of ID Tags and sensors may include a plurality of ID Tags and sensors that are automatically detected and provide real-time data regarding at least one characteristic of a machine. The list of ID Tags and sensors that are currently providing real-time data may be dynamically updated based on each new ID Tag and/or sensor currently providing real-time data and each existing ID Tag and/or sensor currently disabled from providing real-time data. So the list of current components and sensors may dynamically change depending on components and sensors being disabled or enabled to communicate with the collection computer 112.

Sensors 114 may include one or more sensors in communication with one or more collection computers 112. In some embodiments, sensors 114 may communicate with a collection computer 112 through a CAN, ADN, NMEA 2000, or other type of network connection (e.g., USB, Bluetooth, or the like). Sensors 114 may monitor and/or measure any of a variety of different system aspects and/or characteristics (e.g., mechanical, hydraulic, or electrical) of a machine or other equipment. These sensors may be directly mounted and/or integrated into one or more components of the machine.

ID Tags 116 may include one or more ID Tags in communication with one or more collection computers 112. ID Tags 116 may be interrogated via a scanning device, or some other specialized hardware. In some embodiments, at least the ID Tags 116 or the interrogation hardware may communicate with a collection computer 112 through a CAN, ADN, NMEA 2000, or other type of network connection (e.g., USB, Bluetooth, or the like). ID Tags 116 may include embedded or otherwise stored digital information that uniquely identifies the associated component included in a machine or other equipment. At least a portion of the ID Tags 116 may be directly mounted and/or integrated into one or more components of the machine.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including client computers 102-105, collection computers 112, MCSC 110, or the like. In at least one of various embodiments, sensors 114 may be coupled to network computers via network 108, which is not illustrated in FIG. 1B. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computer 103-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between client computers 102-105, MCSC 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Client Computer

Figure 2:
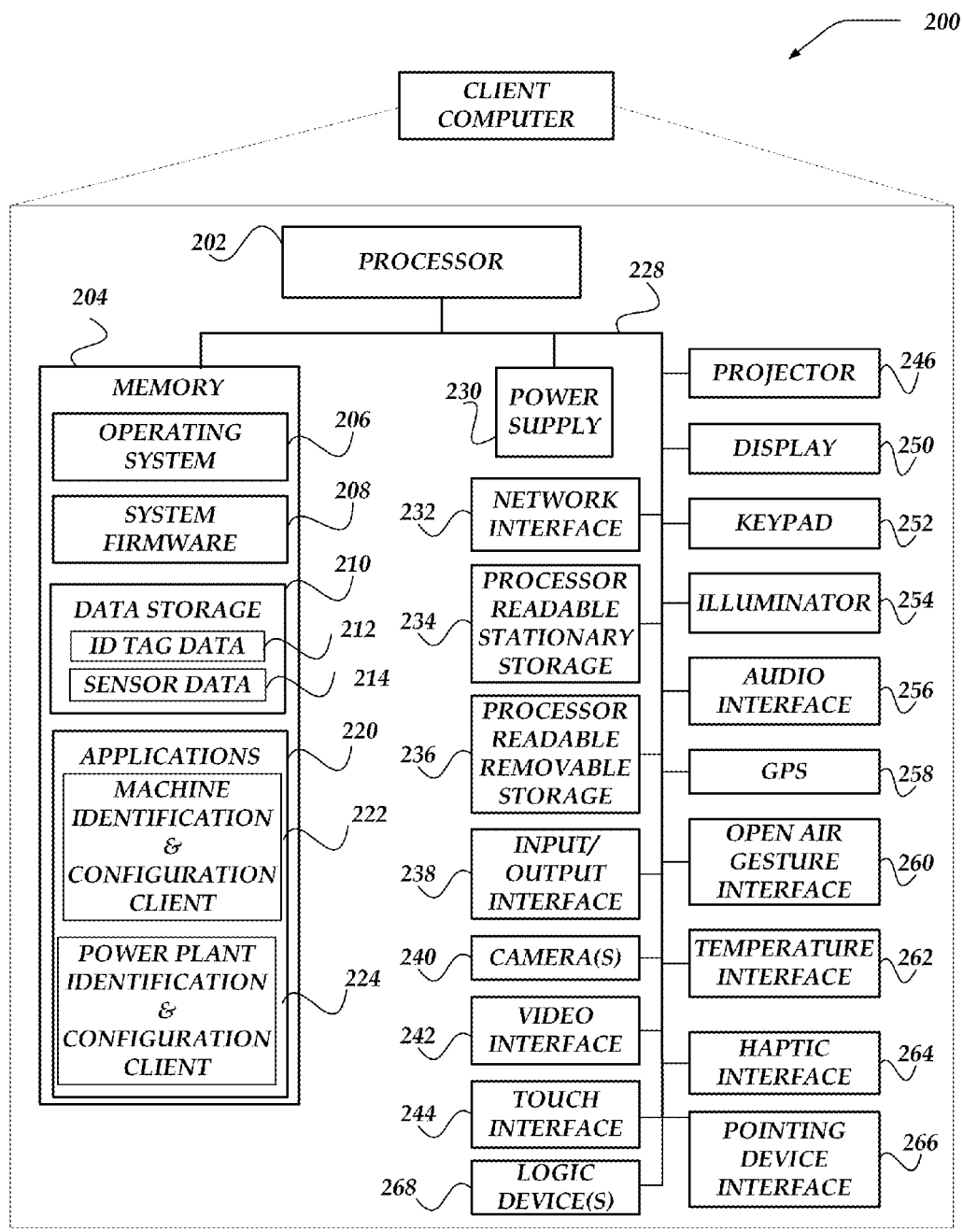
FIG. 2 shows an embodiment of a client computer that may be included in a system such as that shown in FIG. 1B.

FIG. 2 shows one embodiment of client 200 that may include many more or less components than those shown. Client computer 200 may represent, for example, at least one embodiment of client computers 102-105 shown in FIG. 1B. Client computer 200 may be a mobile device (e.g., a smart phone or tablet), a stationary/desktop computer, or the like.

Client computer 200 may include processor 202, such as a central processing unit (CPU), in communication with memory 204 via bus 228. Client computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Client computer 200 may optionally communicate with a base station (not shown), or directly with another computer. And in one embodiment, although not shown, an accelerometer or gyroscope may be employed within client computer 200 to measuring and/or maintaining an orientation of client computer 200.

Additionally, in one or more embodiments (not shown in the figures), the client device may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the client device may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Client computer 200 may also comprise input/output interface 238 for communicating with external peripheral devices or other computers such as other mobile computers and network computers. Input/output interface 238 may enable client computer 200 to communicate with one or more servers, such as MCSC 110 of FIG. 1B. In some embodiments, input/output interface 238 may enable client computer 200 to connect and communicate with one or more collection computers, such as collection computers 112 of FIG. 1B. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like.

Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, client computer 200 may, through other components, provide other information that may be employed to determine a physical location of the mobile computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view sensor data. In at least one of various embodiments, the browser may enable a user to view reports of sensor data that is stored by MCSC 110 of FIG. 1B. In some embodiments, the browser/user interface may enable the user to customize a view of the report, such as which ID Tag or sensor data is displayed, what types of graphics or information may be displayed, or the like. As described herein, the extent to which a user can customize the reports may depend on permissions/restrictions for that particular user.

In various embodiments, the user interface may present the user with one or more initial templates for viewing the ID Tag or sensor data. In some embodiments, the templates may include gauges, graphs, maps, charts, or other visualizations that can be used to visually represent sensor data. In some embodiments, the template may include a list of sensors, component types, ID Tags, and the like that are available for which the user can view corresponding data. This corresponding data may be current real-time sensor data (e.g., by employing a real-time gauge) and/or historic data (e.g., by using a line graph). In some embodiments, the user may be enabled to select from a component or sensor list which components or sensors to include in the template/report. In other embodiments, the ID Tags and sensors may be initially selected based on the machine that is being monitored, the type of sensors being used, or the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile device.

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, client computer 200 may be enabled to employ various embodiments, combinations of embodiments, processes, or parts of processes, as described herein.

Illustrative Server Computer

Figure 3:
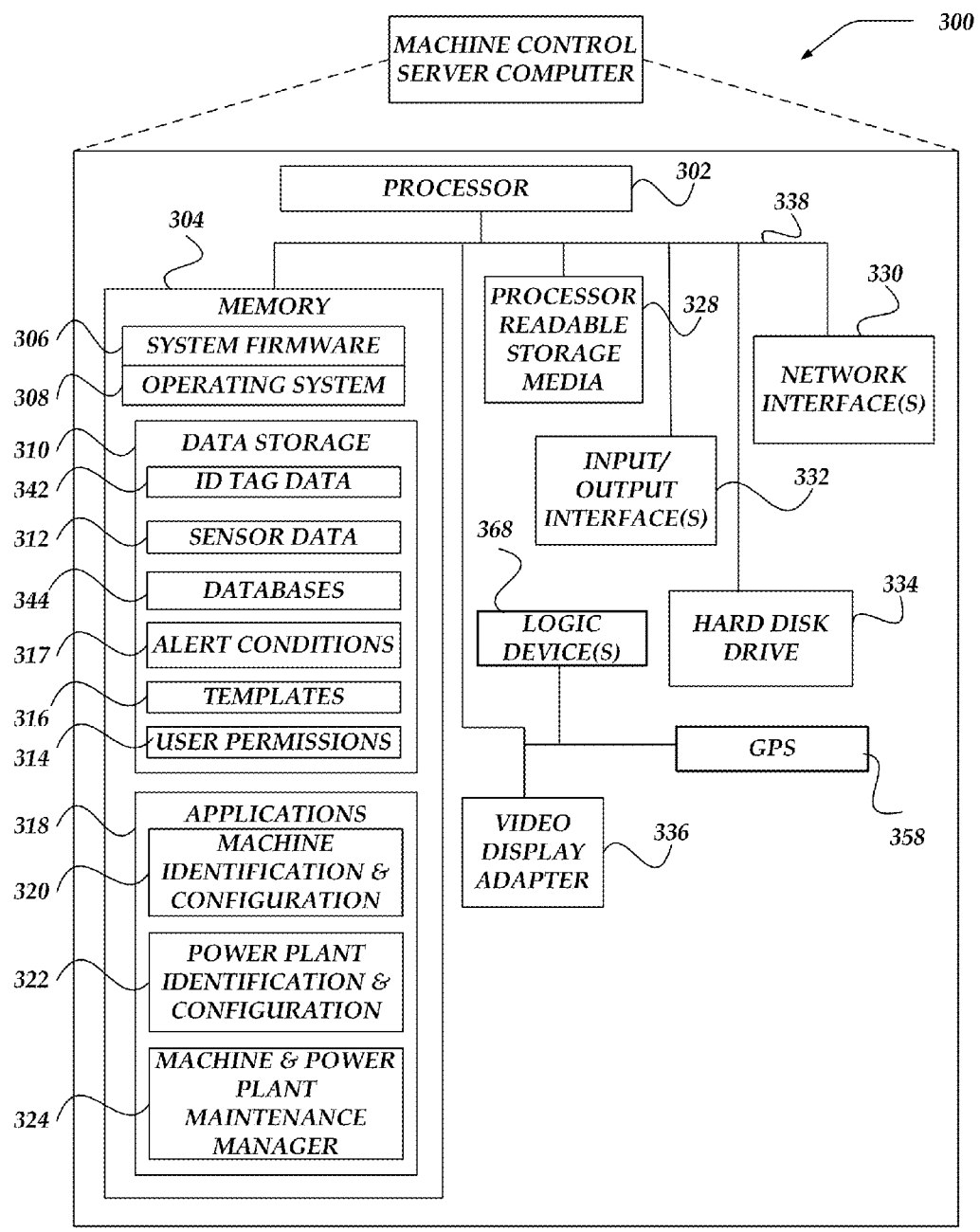
FIG. 3 illustrates an embodiment of a server computer that may be included in a system such as that shown in FIG. 1B.

FIG. 3 shows one embodiment of a machine control server computer (MCSC) 300, according to one embodiment of the invention. MCSC 300 may include many more or less components than those shown. The components shown, however, are sufficient to disclose an illustrative embodiment for practicing the invention. MCSC 300 may represent, for example MCSC 110 of FIG. 1B. MCSC 300 may be a server computer, a server device, or simply a server.

MCSC 300 may include processor 302, such as a CPU, processor readable storage media 328, network interface unit 330, an input/output interface 332, hard disk drive 334, video display adapter 336, and memory 304, all in communication with each other via bus 338. In some embodiments, processor 302 may include one or more central processing units.

Additionally, in one or more embodiments (not shown in the figures), the computing device may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the computing device may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 3, MCSC 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

MCSC 300 also comprises input/output interface 332 for communicating with external devices, such as a keyboard or other input or output devices not shown in FIG. 3. Input/output interface 332 can utilize one or more communication technologies, such as USB, infrared, Bluetooth™, or the like.

GPS transceiver 358 can determine the physical coordinates of MCSC 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of MCSC 300 on the surface of the Earth. It is understood that under different conditions, GPS transceiver 358 can determine a physical location for server computer 200. In at least one embodiment, however, MCSC 300 may, through other components, provide other information that may be employed to determine a physical location of the mobile computer, including for example, a Media Access Control (MAC) address, IP address, and the like.

Memory 304 generally includes RAM, ROM and one or more permanent mass storage devices, such as hard disk drive 334, tape drive, optical drive, and/or floppy disk drive. Memory 304 stores operating system 308 for controlling the operation of MCSC 300. Any general-purpose operating system may be employed. System firmware 306 is also provided for controlling the low-level operation of MCSC 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by MCSC 300 to store, among other things, applications 318 and/or other data. For example, data storage 310 may also be employed to store information that describes various capabilities of MCSC 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of MCSC 300, including, but not limited to processor-readable storage media 328, hard disk drive 334, or the like.

Data storage 310 may include sensor data 312, user permissions 314, templates 316, ID Tag data 342, databases 344, and/or alert conditions 317. In some embodiments, this information (sensor data 312, ID Tag data 342, databases 344, user permissions 314, templates 316, and alert conditions 317) may be stored on a same server computer or on a plurality of separate server computers.

Sensor data 312 may include one or more databases for sensor data that has been collected from a collection computer (e.g., collection computers 112) to MCSC 300. In various embodiments, a separate database may be maintained for each separate collection computer. In some embodiments, sensor data 312 may be transmitted from a collection computer to the server computer via a wired or wireless connection. In other embodiments, sensor data 312 may be provided to MCSC 300 via a client computer, such as client computer 200. For example, a collection computer may not have a wireless connection (e.g., if it is out of range of a cellular network tower). A user may take a client computer to the site of the collection computer and upload the sensor data from the collection computer to the client computer (e.g., using a USB connection, accessing an SD card employed by the collection computer, or the like). The user can then upload the sensor data from the client computer to the server computer.

ID Tag data 314 may include one or more databases for ID Tag data that has been collected from a collection computer (e.g., collection computers 112) to MCSC 300. In various embodiments, a separate database may be maintained for each separate collection computer. In some embodiments, ID Tag data 314 may be transmitted from a collection computer to the server computer via a wired or wireless connection. In other embodiments, ID Tag data 314 may be provided to MCSC 300 via a client computer, such as client computer 200. For example, a collection computer may not have a wireless connection (e.g., if it is out of range of a cellular network tower). A user may take a client computer to the site of the collection computer and upload the ID Tag data from the collection computer to the client computer (e.g., using a USB connection, accessing an SD card employed by the collection computer, or the like). The user can then upload the ID Tag data from the client computer to the server computer.

User permissions 314 may include one or more permissions for each of one or more users. Each permission may indicate how much customization a user is authorized to perform. For example, the permissions may indicate if and how a user can customize a collection computer, such as, for example, if a user can select which ID Tag or sensor data to collect, which ID Tag or sensor data to store locally to a collection computer, which ID Tag or sensor data to store remotely at a server computer. The permissions may also indicate if and how a user can customize ID Tag or sensor data reports and/or templates. In some embodiments, a user may be authorized to view data from only a subset of a plurality of ID Tags or sensors. In other embodiments, the user may be authorized to view the data, but may not modify the templates for displaying ID Tag or sensor data reports. In some other embodiments, the user permissions may indicate if a user can provide alert conditions and/or when a user can receive alerts based on alert conditions be satisfied.

Templates 316 may include one or more templates that can be employed for generating a configuring, monitoring, or maintenance report that displays ID Tag and sensor data to a user. In some embodiments, templates may be premade, such as by an administrator. In other embodiments, templates may be automatically generated based on a type of machine and/or component being monitored by the sensors. In yet other embodiments, the templates may be automatically generated based on the ID Tags or sensors that are currently providing real-time data. In various embodiments, at least some of the templates may be customizable by a user. The user may be enabled to manipulate which ID Tag or sensor data (e.g., by selected a sensor from a list of available sensors having previously provided data) is displayed in gauges, maps, charts, graphs or other visualization.

Alert conditions 317 may store one or more alert conditions. Each alert condition may include one or more conditions that need to be satisfied before an alert is sent to a user. Each alert condition may also include a list of one or more users to provide the alert to. Along with each user, a type of alert may also be stored. In this way, users may be provided customized alerts for each alert condition. As described herein, the conditions may be for one or more ID Tags, sensors, single events (e.g., spikes in values, values exceeding a threshold, or the like), multiple events, patterns, or the like.

Databases 344 may include various databases, such as but not limited to collection computer databases, component specification databases, machine databases, machine usage databases, component reliability databases, user databases, maintenance databases, marketplace databases, user community databases, and the like. Furthermore, at least a portion of the above discussed ID Tag and sensor databases may be included in databases 344.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

Applications 318 may include machine and power plant identification and configuration manager 320. Machine and power plant identification and configuration manager 320 may be operative to automatically identify and configure at least one of a machine or a power based on at least one of ID Tag data 342, sensor data 312, or one or more databases found in databases 344, as discussed further below.

Applications 318 may also include machine usage manager 322. Machine usage manager 322 may be operative to monitor and manage the usage of a machine based on at least one of ID Tag data 342, sensor data 312, or one or more databases found in databases 344, as discussed further below.

Applications 318 may include machine maintenance manager 324. Machine maintenance manager 324 may be operative to automatically manage the maintenance of a machine based on at least one of ID Tag data 342, sensor data 312, or one or more databases found in databases 344, as discussed further below.

Any of the manager applications 320, 322, and 324 may perform actions by actively managing a managing computer, such as collection computer 112 of FIG. 1B. In some embodiments, manager application 320/322/324 may provision new databases if new collection computer logs into MCSC 300. Manager applications 320/322/324 may also be operative to manage the intake of ID Tag or sensor data, such as by adding received ID Tag or sensor data to a database that corresponds to the collection computer that collected the ID Tag or sensor data. In some embodiments, if a collection computer begins to collect ID Tag or sensor data from a previously unknown ID Tag or sensor, at least one of the manager applications 320/322/324 may be enabled to assign a new column within a database table for the collection computer for ID Tag or sensor data obtained by the new ID Tag or sensor.

In some embodiments, at least one of the manager applications 320/322/324 may be operative to provide instructions to a collection computer indicating which ID Tags and sensors the collection computer should collect data from, store data locally at the collection computer, and/or transmit data to the server computer or remote storage at the server computer. In some embodiments, these instructions may also indicate how often the collection computer is to collect, store, and/or transmit data. In various embodiments, manager applications 320/322/324 may include a user interface where a user may be enabled to provide this information.

At least one of the manager applications 320/322/324 may be operative to enable a user to customize reports of ID Tag data 243, sensor data 312, databases 344, and the like based on permissions 314 associated with the user. In various embodiments, manager applications 320/322/324 may enable a user to log into an account and access a user interface where they can select ID Tags, sensors, gauges, graphs, or the like, which can be employed to generate a customized report that can be displayed to the user. In various embodiments, application managers 320/322/324 may determine, generate, and/or maintain templates 316.

The manager applications 320/322/324 may be operative to perform predictive analyses bases on ID Tag data 342, sensor data 314, databases 344 and the like. For instance machine maintenance user 324 may be operative to analyze ID Tag and sensor data collected by one or more collection computers (e.g., collection computers 112 of FIG. 1B), as well as information provided by databases, such as a component reliability database to determine one or more patterns associated with component failures. In some embodiments manager applications 320/322/324 may employ ID Tag and sensor data from one or more machines. In various embodiments, these machines may be from different customers/users, located in similar or different geographical regions/environments, used for similar or different purposes, or the like.

Manager applications 320/322/324 may be operative to determine and/or generate alerts based on alert conditions. For instance, if an alert condition is satisfied, machine usage manager 322 may generate and provide an alert to one or more users based on the alert condition. In some embodiments, manager applications 320/322/324 may employ predictive alert conditions, which may be determined based on the patterns determined by predictive analyzer instantiated in one or more of the manager applications 320/322/324.

So, in some embodiments, MCSC 300 may be enabled to employ various embodiments, combinations of embodiments, processes, or parts of processes, as described herein.

Illustrative Collection Computer

Figure 4:
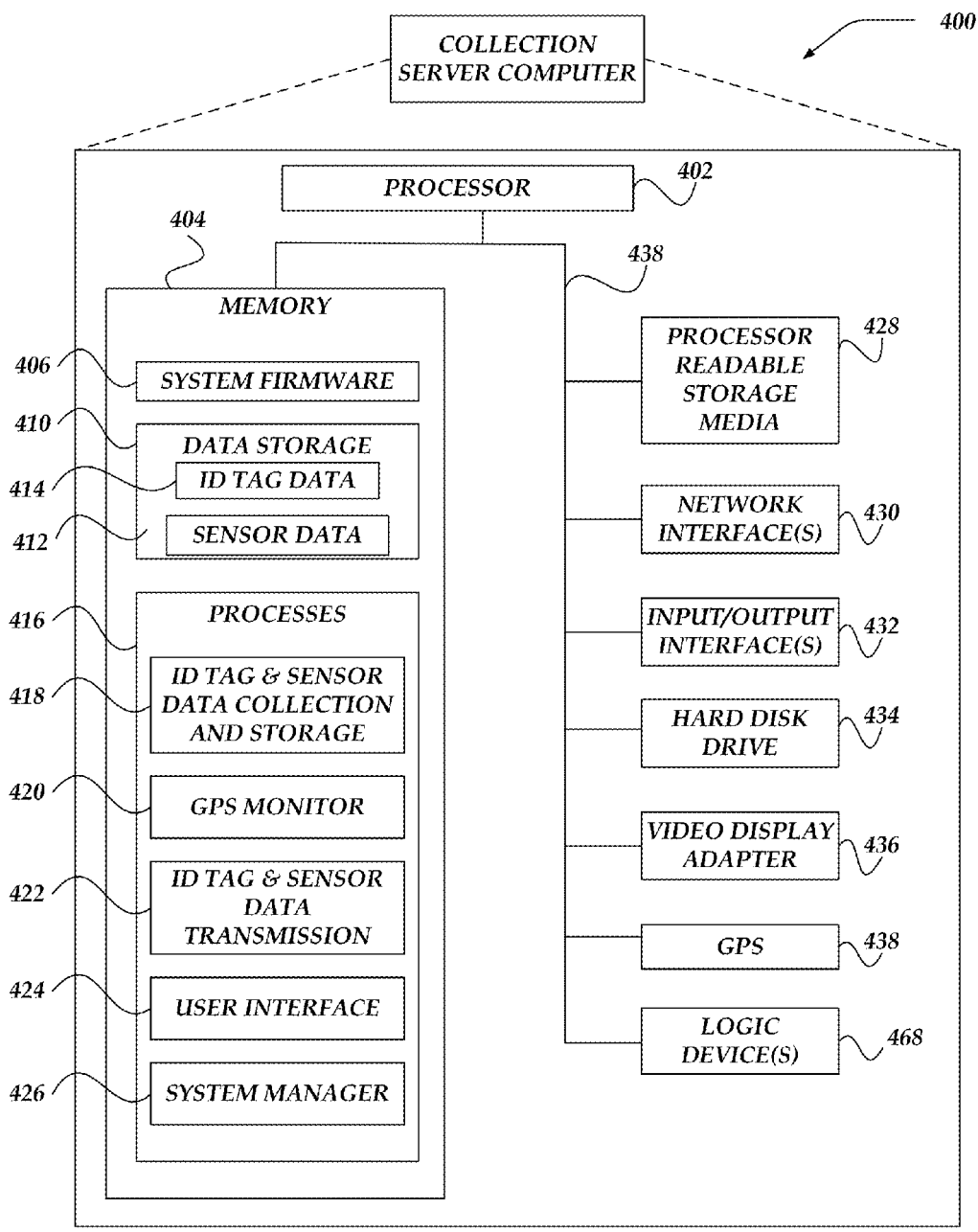
FIG. 4 illustrates an embodiment of a collection computer that may be included in a system such as that shown in FIG. 1B.

FIG. 4 shows one embodiment of collection server computer 400, according to one embodiment of the invention. Collection server computer 400 may include many more or less components than those shown. The components shown, however, are sufficient to disclose an illustrative embodiment for practicing the invention. Collection server computer 400 may represent, for example, one of collection computers 112 of FIG. 1B. Thus, collection server computer 400 may be a collection computer.

Collection server computer 400 may include processor 402, such as a CPU, processor readable storage media 428, network interface unit 430, an input/output interface 432, hard disk drive 434, video display adapter 436, GPS 438, and memory 404, all in communication with each other via bus 438. In some embodiments, processor 402 may include one or more central processing units.

Additionally, in one or more embodiments (not shown in the figures), the collection computer may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the collection computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 4, collection server computer 400 also can communicate with the Internet, cellular networks, or some other communications network (either wired or wireless), via network interface unit 430, which is constructed for use with various communication protocols. Network interface unit 430 is sometimes known as a transceiver, transceiving device, or network interface card (NIC). In some embodiments, collection server computer 400 may communicate with a server computer, such as MCSC 110 of FIG. 1B; sensors, such as sensors 112 of FIG. 1B; and/or client computers, such as client computers 102-105 of FIG. 1B, via the network interface unit 420.

Collection server computer 400 also comprises input/output interface 432 for communicating with external devices, such as a various sensors or other input or output devices not shown in FIG. 4. Input/output interface 432 can utilize one or more communication technologies, such as USB, infrared, Bluetooth™, or the like.

Memory 404 generally includes RAM, ROM and one or more permanent mass storage devices, such as hard disk drive 434, tape drive, optical drive, and/or floppy disk drive. Memory 404 may store system firmware 406 for controlling the low-level operation of collection server computer 400 (e.g., BIOS). In some embodiments, memory 404 may also store an operating system for controlling the operation of collection server computer 400.

Although illustrated separately, memory 404 may include processor readable storage media 428. Processor readable storage media 428 may be referred to and/or include computer readable media, computer readable storage media, and/or processor readable storage device. Processor readable storage media 428 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by collection server computer 400 to store, among other things, sensor data 412, processes 416, and/or other data. For example, data storage 410 may further include program code, data, algorithms, and the like, for use by a processor, such as processor 402 to execute and perform actions. In one embodiment, at least some of data storage 410 might also be stored on another component of collection server computer 400, including, but not limited to processor-readable storage media 428, hard disk drive 434, or the like.

Sensor data 412 may include data that is collected from one or more sensors. In various embodiments, sensor data 412 may store sensor data until it is successfully transmitted to a server, such as MCSC 110 of FIG. 1B; until it is deleted by a user (e.g., if the user transfers all the sensor data from the collection computer to a client computer (e.g., client computers 102-105 of FIG. 1B)); or the like.

Likewise, ID Tag data 414 may include data that is collected from one or more ID Tags. In various embodiments, ID Tag data 414 may store ID Tag data until it is successfully transmitted to a server, such as MCSC 110 of FIG. 1B; until it is deleted by a user (e.g., if the user transfers all the sensor data from the collection computer to a client computer (e.g., client computers 102-105 of FIG. 1B)); or the like.

Processes 416 may include computer executable instructions that can execute on processor 402 to perform actions. In some embodiments, one or more of processes 416 may be part of an application that may be loaded into mass memory and run on an operating system Processes 416 may include ID Tag and sensor data collection and storage 418, GPS monitor 420, ID Tag and sensor data transmission 422, user interface 424, and system manager 426.

ID Tag and sensor data collection and storage 418 may manage the collection/intake of data from one or more ID Tags or sensors and may manage the local storage/logging of the collected ID Tag and sensor data at the collection computer. As described herein, a user may customize the collection computer such that it may or may not collect data from each ID Tag and sensor that it is in communication with. In some embodiments, ID Tag and sensor data collection and storage 418 may manage the sampling rate of one or more sensors, which may be selected by the user or automatically determined. ID Tag and sensor data collection and storage 418 may manage the collection of ID Tag and sensor data based on the user customizations.

GPS monitor 420 may monitor GPS 438 for changes and may report changes to a user. In this way a user can track the movement of the equipment or machine that is being monitored by the sensors/collection computer. Changes in the GPS location can be employed to help determine if someone is attempting to steal the equipment, such as if the equipment is not to be removed from a jobsite.

ID Tag and sensor data transmission 422 may manage the transmission of ID Tag and sensor data to a server, such as MCSC 110 of FIG. 1. As described herein, a user may customize a collection computer such that it may transmit some or all collected data to the server for remote storage by the server. The user may also be enabled to customize how often or when data may be transmitted to the server, which may be managed by Id Tag and sensor data transmission 422. If the collection computer is unable to transmit sensor data to the server (e.g., if the collection computer does not have a network connection), then ID Tag and sensor data transmission 422 may wait to begin transmission once the collection computer is again able to transmit data (e.g., if the network connection is restored). In some embodiments, ID Tag and sensor data transmission 422 manage the buffering of ID Tag or sensor data (e.g., in a queue) so that when a network connection is restored, the buffered data may be transmitted to the server.

User interface 424 may enable the user to provide the collection, storage, and transmission customizations described herein. In some embodiments, user interface 424 may enable a user to view to collected data in real-time or near-real time with the collection computer.

System manager 426 may provide other functionality to the collection server computer 400. For example, system manager 426 may provide power management to the collection computer. In some embodiments, system manager 426 may be enabled to put the collection computer into a power saving mode when sensors are not being monitored, the equipment/machinery being monitored is shut off, or the like. System manager 426 may be enabled to "wake up" from this power saving mode based on a variety of watchdog conditions. For example, if the GPS or an accelerometer detects a change, then the system may wake up and transmit its location to the server.

So, in some embodiments, collection server computer 400 may be enabled to employ various embodiments, combinations of embodiments, processes, or parts of processes, as described herein. Moreover, in various embodiments, collection server computer 400 may be enabled to employ various embodiments described above in conjunction with MCSC 300 of FIG. 3.

Overview of a Modular Power Plant

Figure 5:
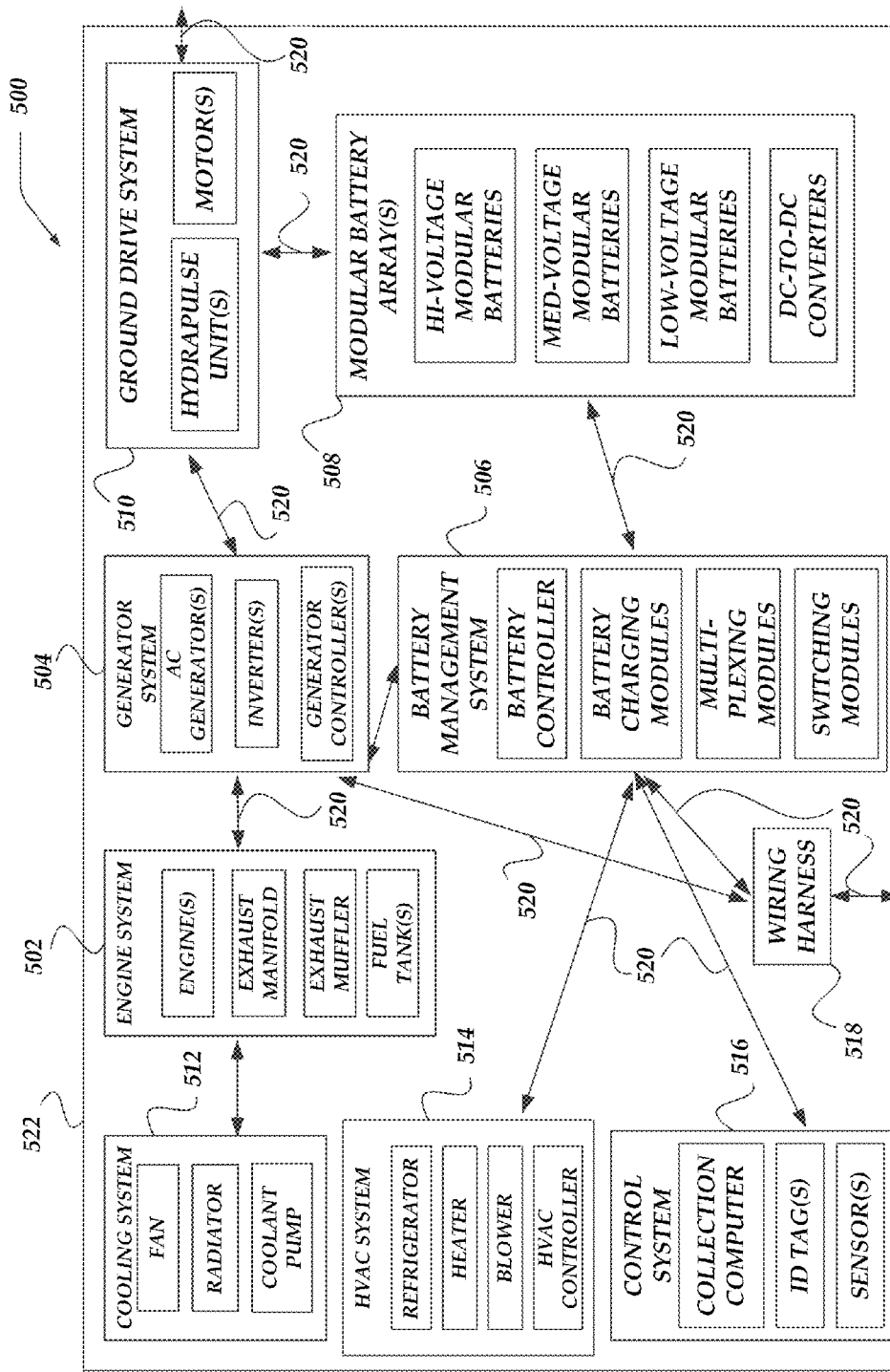
FIG. 5 illustrates a schematic diagram of an embodiment of a modular power plant that is consistent with the various embodiments described herein.

FIG. 5 illustrates a schematic diagram of an embodiment of a modular power plant 500 that is consistent with the various embodiments described herein. Power plant 500 may include similar features to power plant 150 of FIGS. 1A-1B and/or power plant 600 of FIG. 6. Power plant 500 may include at least one of a skid 522, a frame, or a chassis. Various embodiments of power plant 500 also include at least one of an engine system 502, a generator system 504, a battery management system 506, and one or more modular battery arrays 508. In some embodiments, power plant 500 includes a ground drive system 510, a cooling system 512, and a heating, ventilating, and air conditioning system (HVAC) 514. Each of the power plant components, systems, or subsystems may be integrated with skid 522 via one or more mounts, couplers, fasteners, or the like. Any of the mounts, couplers, or fasteners may be a vibration-reducing and/or absorbing mount, coupler, or fastener.

Furthermore, power plant 500 may include a control system 516. Control system 516 may control the configuration and operation of power plant 500. Control system may include a computer device, such as but not limited one or more client computers, such as but not limited to client computer 200 of FIG. 2, a server computer, such as but not limited to server computer 300 of FIG. 3, or a collection computer such as but not limited to collection server computer 400 of FIG. 4. In at least one embodiment, control system 516 includes an application specific integrated circuit (ASIC), a field programmable gate array (FPGA), or any other instructing and/or logic-executing device.

Power plant 500 may also include one or more ID Tags and/or sensors as discussed throughout to enable at least the automatic and remote identification, configuration, monitoring, and/or operation of power plant 500. At least a portion of the ID Tags and/or sensors may be included in control system 516. Although not shown in FIG. 5, other ID Tags and/or sensors may be included with any of the power plant components included in power plant 500. A bus, such as power bus 520 enables the transmission of power and information-carrying signals between the various components, systems, and subsystems. The power bus 520 may provide power from the at least one of the generator system 504, the battery management system 506, or modular batter array to the various components, systems, and subsystems for the operation of power plant 500.

At least portions of the power bus 520 may be integrated with or included in wiring harness 518. Some portions of power bus 520 may transmit mechanical power. At least some portions of power bus 520 may transmit electrical power. Portions of power bus 520 may transmit signals, including electronic, optical, and/or mechanical signals that encode information or data. The power bus 520 may transmit power and/or signals that are wired, wireless, or optical signals. The power bus 520 may transmit power and/or signals via mechanical means, such as but not limited to belts, chains, drive shafts, and the like. In at least one embodiment, the power bus 520 carries thermal energy, such as steam or a heated fluid.

Engine system 502 includes at least one or more engines. In various embodiments, engine system 502 may include one or more fuel tanks to store consumable fuel to power the one or more engines. In other embodiments, a fuel tank included in the machine provides the consumable fuel to the one or more engines. As discussed herein, the one or more engines may include any engine that is powered by any fuel. For instance, the engine may be a combustion engine, a steam engine, or the like. The engine may be rated at any power value or displacement volume value. For instance, the one or more engines may include one or more gasoline powered engines of any displacement volume or power rating, such as but not limited to 25 horsepower (hp), 50 hp, 57, 75 hp, 100 hp, 125 hp, 150 hp, or any other such powered-rating.

In at least one embodiment, an engine may be a modular engine such that engines may easily be installed, removed, and/or swapped in power plant 500. For instance, if power plant 500 includes a 25 hp engine and a specific application of the machine requires a larger engine, such as a 75 hp engine, the 25 hp engine may be swapped out for the 75 hp engine. Because both the engine and the batteries are modular, each of the engine size and the number or type of included batteries may be varied to configure the power plant for a particular application of the machine. For instance, for a particular application, the power plant may be configured with a 25 hp engine and 16 batteries included in the battery array. For the same or similar application, the power plant may be configured with a 50 hp engine and 8 batteries. Accordingly, depending on the engines and batteries available to a user, the user may configure the power plant differently for a particular application.

Engine system 502 may include an exhaust subsystem to channel and remove exhaust generated via the combustion of the fuel. The exhaust subsystem may include at least one or more exhaust manifolds, one or more exhaust headers, and one or more mufflers. Engine system 502 may include any components associated with engine systems, such as but not limited to air filters, oil pumps, fuel pumps, and the like. Any of the components included in engine system 502 may be coupled, mounted, or installed on skid 522 via mounts, couplers, fasteners, or the like. Any of the mounts, couplers, or fasteners may be vibration-reducing mounts, couplers, or fasteners. For instance, each of the one or more engines may be mounted to the skid via one or more vibration-reducing mounts.

Power bus 520 transmits at least a portion of the mechanical energy generated by engine system 502 to the generator system 504. In a non-limiting exemplary embodiment, a driveshaft transmits rotational energy from the engine system 502 to the generator system 504. Generator system 504 includes one or more alternating current (AC) generators, one or more inverters, and one or more generator controllers. The one or more AC generators may include a permanent magnet AC (PMAC) generator. The generators may be rated at any power value, such as but not limited to 20 kilowatts (KW) or 30 KW. One or more of the generators may be a hydrapulse generator.

The one or more AC generators may convert at least a portion of the received mechanical energy into one or more AC power signals. The one or more inverters may be employed to modulate or "clean up" the AC power signals, via an AC to DC and back to AC conversion. The one or more inverters may ensure that the AC power signals generated by the generator system 504 are a single phase, significantly sinusoidal AC power signal. The inverters may be employed to control the voltage, peak current, phase, and/or frequency of the one or more AC power signals. The generator system 504 may also include one or more generator controller(s) that control the operation of the one or more AC generators and/or the one or more inverters. A generator controller may include a processor device such as but not limited to a collection computer, a client computer, a server computer, or any other such computer device. In at least one embodiment, a generator controller includes an application specific integrated circuit (ASIC), a field programmable gate array (FPGA), or any other instructing and/or logic-executing device. Each of the components of the generator system 504 may be mounted, coupled, or fastened to the skid 522 via one or more mounts, couplers, or fasteners.

In some embodiments, the power bus 520 may transmit at least a portion of the electric power generated by the generator system 502, via the one or more AC power signals, to the machine. Such transmission of the one or more AC power signals may be enabled via wires, cables, waveguides, or the like. Another portion of the electric power is transmitted, via power bus 520, to at least one of the battery management system 506 and/or the modular battery arrays 508 to charge the batteries. In embodiments where the batteries provide all the power required to operate the machine, the power bus 520 does not transmit electric power directly from the generator system 504 to the machine. In such embodiments, the power is transmitted to the machine from at least one of the modular battery arrays 508 or the battery management system (BMS) 506.

BMS 506 may include at least one of a battery controller, one or more battery charging modules, one or more multiplexing modules, or one or more switching modules. BMS 506 may mange the charging and discharging of the batteries included modular battery arrays 508. BMS 506 may also control electrically coupling and decoupling batteries included in the modular battery arrays 508 to the power bus 520. Although not shown in FIG. 5, in some embodiments, the BMS 506 may include fuses, circuit breakers, and the like to protect power plant 500 from over-voltage and/or over-current events. The battery controller may include a processor device such as but not limited to a collection computer, a client computer, a server computer, or any other such computer device. In at least one embodiment, a generator controller includes an application specific integrated circuit (ASIC), a field programmable gate array (FPGA), or any other instructing and/or logic-executing device.

The battery controller may control the operation of the battery charging modules, which charge the batteries included in the modular battery arrays 508. In some embodiments, the charging modules may include one or more rectifiers to convert the one or more AC power signals to one or more DC signals. The battery controller may control the operation of the multiplexing and switching modules. The multiplexing and switching modules may include relays or other types of switches. These modules may electrically couple and decouple the batteries from the power bus, as well as route power signals to and from the batteries to other components of the power plant 500 or to the machine.

The power bus 520 provides electrical power to be stored in the batteries to the modular battery arrays 508. The battery arrays 508 may include battery packs of varying voltages. For instance, the instance, battery arrays 508 may include high-voltage, medium voltage, and/or low voltage battery packs. The voltage may be any voltages required for the machine, such as but not limited to 12 VDC, 24 VDC, or 48 VDC. The battery arrays 508 may include one or more DC-to-DC convertors to transform DC voltages of DC power signals transmitted to, from, and between the batteries included in the modular battery arrays 508.

Power plant 500 may include a ground drive system 510 that drives a mobile machine through its environment. A ground drive system may include at least one or more hydrapulse units and/or one or more motors to propel the machine. The batteries and/or AC generators may provide electrical power to the ground drive system 508.

To cool at least the engine system 502, power plant 500 may include a cooling system 512. The cooling system 512 may include at least one or more radiators, a housing to house a cooling fluid or coolant, one or more coolant pumps to circulate the coolant, and one or more fans. At least one of the fans may be a reversible and/or variable speed fan. The batteries and/or AC generators may provide electrical power to operate the cooling system 512.

In at least one embodiment, power plant 500 includes an heating, ventilating, and air conditioning (HVAC) system 514 to control the environment within one or more cabins or chambers included in the machine. Controlling the environment of a cabin may include controlling the air temperature, air pressure, airflow, and the like within the cabin. HVAC system 514 may include housing that houses various ducts and/or duct hookups, air filters, a refrigerator, a heater, a blower, and/or an HVAC controller. In at least one embodiment, HVAC system 514 includes a high voltage compressor and a compressor controller. The blower may be a variable speed fan. The heater may be a high voltage heating element.

Figure 6:
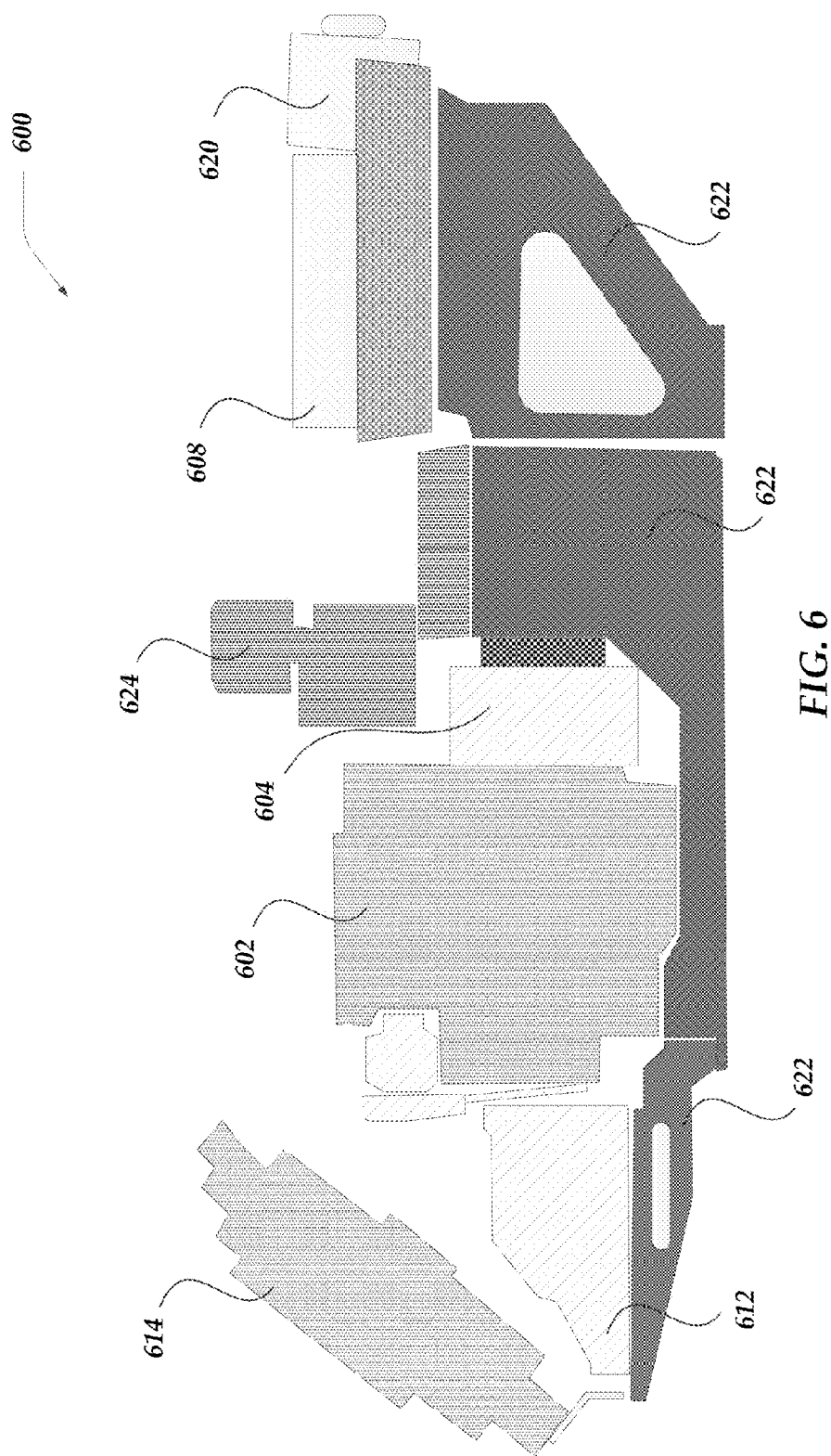
FIG. 6 illustrates a schematic diagram of another embodiment of a modular power plant that is consistent with the various embodiments described herein.

FIG. 6 illustrates a schematic diagram of another embodiment of a modular power plant 600 that is consistent with the various embodiments described herein. Power plant 600 may include similar features to power plant 150 of FIGS. 1A-1B and/or power plant 500 of FIG. 5. Power plant 600 is includes and is integrated with skid 622. Skid may be mechanically and electronically coupled to a variety of machine types. Power plant 600 includes an engine system 602, a generator system 604, and one or more modular battery arrays 608. Power bus 620 of power plant 600 may couple to the various power busses, systems, and subsystems of various machines discussed herein to provide power for the operation of the machine.

In various embodiments, power bus 600 includes a hydraulic/pneumatic system 624. The hydraulic/pneumatic system 624 may include various pumps and other hydraulic/pneumatic components. Hydraulic/pneumatic system 624 may provide mechanical power to the machine, such as but not limited to hydraulic/pneumatic power. In various embodiments, hydraulic/pneumatic system 624 may be included in or at least assist a ground drive system of power plant 600. Although not shown in FIG. 6, power plant 600 may include various motors, hydrapulse units, and the like to provide mechanical power to the machine.

Power plant 600 may include an HVAC system 614 that controls the environment with a cabin of the machine during the operation of the machine. The cabin may house a human, such as an operator or a passenger in a vehicle. Power plant 600 includes a cooling system 612. Cooling system 612 may at least partially cool one or more engines included in engine system 602 during the operation of the machine. At least one of the batteries included in battery array 608 or one of the generators included in generator system 604 may provide power for the operation of any components included in power plant 600, including but not limited to the components included in HVAC system 614, the cooling system 612, or hydraulic/pneumatic system 624.

Generalized Operations

The operation of certain aspects of the invention will now be described with respect to FIGS. 7-10. In at least one of various embodiments, processes 700, 800, 900, and 1000 of FIGS. 7, 8, 9, and 10, respectively, may be implemented by and/or executed on a combination of computers, such as collection server computer 400 of FIG. 4; client computer 200 of FIG. 2; and/or MCSC 300 of FIG. 3. Additionally, various embodiments described herein can be implemented in a system such as system 100 of FIG. 1B.

Figure 7:
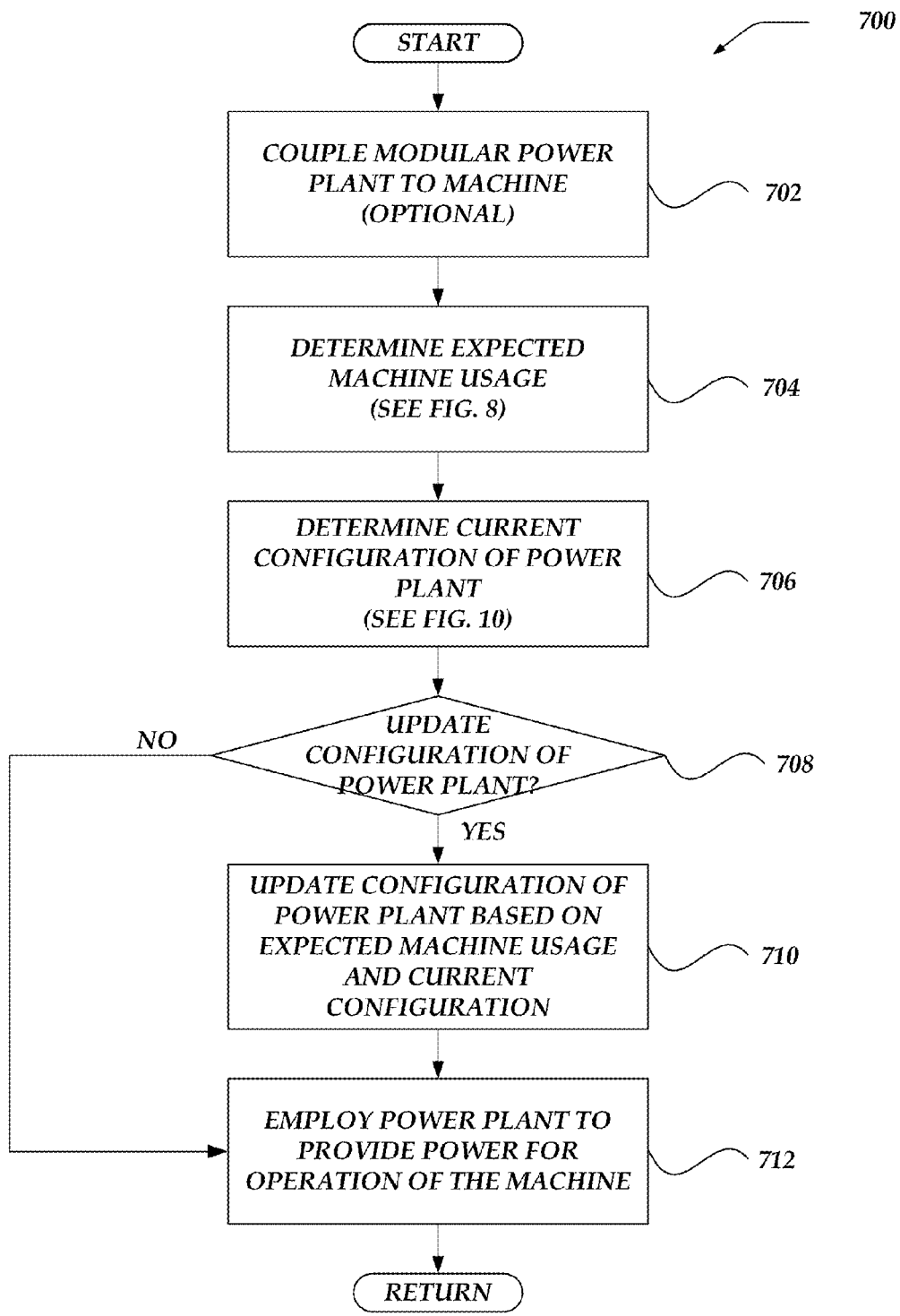
FIG. 7 illustrates a logical flow diagram generally showing one embodiment of a process for operating a machine powered by a modular power plant.

FIG. 7 illustrates a logical flow diagram generally showing one embodiment of a process for operating a machine powered by a modular power plant. As discussed through-out, at least some of the modular components included in the machine and/or included in the power plant may include one or more ID Tags. Furthermore, one or more of the components included in the machine and/or included in the power plant may include one or more sensors and one or more collection computers. Process 700 may begin, after at start block, at optional block 702, where a modular power plant is coupled to the machine. The power plant may be similar to any of the power plants 150, 500, and 600 of FIGS. 1A-1B, 5, and 6. The machine may be any machine that requires power for the machine's operation, including but not limited to any of the machines discussed herein. At block 702, the power plant may be electrically and/or mechanically coupled to the machine. In some embodiments of process 700, the power plant may have previously been coupled to the machine.

The power plant may include a modular skid or a frame. Each of the modular power plant components may be integrated with the skid, such that the power plant is a single, integrated unit. At block 702, the power plant may be at least mechanically coupled to the machine by installing the power plant on or within the machine. In some embodiments where the machine is a mobile machine, the power plant is a mobile power plant that travels with the machine. A power plant may be shipped through standard shipping means to multiple locations of various machines.

As discussed throughout, the power plant may include one or more engines, one or more generators, one or more battery arrays, and one or more power busses that enable providing power to the machine. At block 702, the power busses may electrically couple the one or more generators and/or the one or more battery arrays to various power busses, components, and/or systems/subsystems of the machine. In various embodiments, the one or more power busses at least be partially houses, supported, or otherwise included in one or more wiring harnesses included in the power plant and integrated with the skid. In at least one embodiment, a skid with a particular footprint may be employed and installed on a variety of machine types. Accordingly, a single power plant may be configured for and installable on multiple machine types. For instance, power plant may configured for and installed on a dump truck. After powering the dump truck, the power plant may be configured for and installed on a forklift. The power plant integrated on the skid may be automatically or manually configured based on the machine type. Accordingly, the power plant and the skid may be separately maintained.

At block 704, the expected machine usage is determined. Various embodiments of determining the expected usage of the machine are discussed in the context of FIGS. 8 through 9. However briefly, in various embodiments, determining the machine usage may include identifying the machine. Identifying the machine may include manually identify the machine, such as when a user manually inputs an identification of the machines into a system, such as but not limited to system 100 of FIG. 1B. In some embodiments, identifying the machine may include automatically identifying the machine via one or more ID tags included with the machine components. In at least one embodiment, identifying the machine may include optically scanning an identification of the machine into the system. In at least one embodiment, the machine type may be based on both an amount and a component type of the one or more components that are coupled to the machine. The machine type may be dynamically provided.

Once the machine and/or power plant has been identified, predictive analyses or heuristics are utilized to determine an expected usage of the machine. The expected usage may be based on a previously determined machine usage, the specific machine operator, the user's social network, network of machine users, and the like. For instance, the previous usage may be based on a prior use of the specifically identified machine and/or a previous usage of another machine that is of an equivalent or similar machine type.

The expected usage may be based on a specific application of the machine, such as an application defined by a user. The expected usage may be further based on the operator or user of the machine, user permissions of the user, geo-location or environment of the user, and the like. A predictive analysis determines the likely expected use of the machine based on knowledge of how the machine (and/or other machines of similar machine type) was previously used, location, user community, and the like. Information included in system database may be used in the predictive analysis, including but not limited to machine & component usage databases, user databases, user community databases, and the like. In at least one embodiment, the expected machine usage may be based on the terms of a rental agreement of at least the power plant and/or the machine.

At block 706, the current configuration of the power plant is determined. Various embodiments of determining the current configuration of the power plant are discussed in the context of process 1000 of FIG. 10. However briefly, in various embodiments, determining the current configuration of the power plant may include determining power plant components currently included in the power plant. The power plant components may be determined manually or automatically. In at least one embodiment, determining the power plant components may be based on one or more ID Tags included in the power plant components.

In at least one embodiment, at block 706, the number and/or type of batteries included in the one or more battery arrays is determined. In some embodiments, the number and/or type of batteries that are electrically coupled to the power bus of the power plant are determined. Electrical switches included in the power plant may electrically couple and decouple batteries included in the battery array from the power bus. The configuration of the power plant may include indicators of how many batteries are included in the battery arrays, and of the batteries that are included, the subset of the batteries that are coupled to the power bus. For instance, the number and type of batteries included in the one or more battery arrays, and which ones are coupled to the power bus, may be determined automatically via at least one or more collection computers included in the power plant and ID Tags included in each battery included in the one or more battery arrays and the switches. The current configuration of the power plant may be determined based on the current power plant components. The current configuration of the power plant may include determining a peak amount of electrical energy that is currently available from the batteries. The peal amount of electrical energy may be based on a current charge level of each of the batteries.

In some embodiments, at least a minimum threshold and a maximum threshold for the electrical energy to be provided by the batteries to the machine is determined. The thresholds may be based on at least one of the machine type, the expected machine usage, or the current configuration of the power plant. For instance, at least one of the thresholds may be determined based the geo-location of the machine. In some embodiments, the thresholds are based on the peak amount of electrical energy that is currently available from the batteries. At block 706, the thresholds may be dynamically provided to a system, such as system 100 of FIG. 1B.

At decision block 708, it is determined whether the configuration of the power plant is required to be updated based on the current configuration and the expected machine usage. The decision at block 708 may be based on at least one of the minimum or maximum threshold for the electrical energy provided by the batteries, as well as the expected machine usage or peak amount of electrical energy that is currently available from the batteries. For instance, if the current configuration of the power plant is over- or under-powered for the expected machine usage, the configuration of the power plant may be required to be updated. Furthermore, if the current configuration of the power plant is consistent with a rental agreement of the power plant and/or the machine, the configuration of the power plant need not be updated. However, if the configuration is inconsistent with a rental agreement, the configuration will be updated. If the configuration is to be updated, process 700 flows to block 710. Otherwise, process 700 flows to block 712.

At block 710, the configuration of the power plant is updated based on at least the expected machine usage and the current configuration of the power plant. For instance, if the power plant is currently under-powered for the expected machine usage, additional batteries may be included and/or installed on the modular battery arrays. In at least one embodiment, the additional batteries may have been previously installed but are currently decoupled from the power bus. In such embodiments, switches are employed to electrically couple the additional batteries to the power bus.

Similarly, if the power plant is currently over-powered for the expected machine usage, at least a portion of the batteries included in the battery arrays may be removed the modular battery arrays. In some embodiments, the portion of the batteries may remain installed in the battery arrays, however, switches may be employed to decouple the portion of the batteries from the power bus. At block 712, the configured power plant provided power to the machine for the operation of the machine. The power may include any type or form or energy, including but not limited to electrical and mechanical energy.

In some embodiments, configuring the power plant may include employing switches, included in the power plant, to electrically couple or decouple at least one of the one or more batteries included in the one or more battery arrays to the one or more power busses of the power plant. At least one of the switches may be operated remotely, via a system or a platform, such as platform 140 of FIG. 1B. Employing the switches may be based on at least one of the expected machine use or the current configuration of the power plant. For instance, the number or batteries to couple or decouple from the power bus may be based on expected peak power required for the operation of the machine and the number of batteries that are currently coupled to the one or more power busses. Process 700 terminates and/or returns to a calling process to perform other actions.

Figure 8:
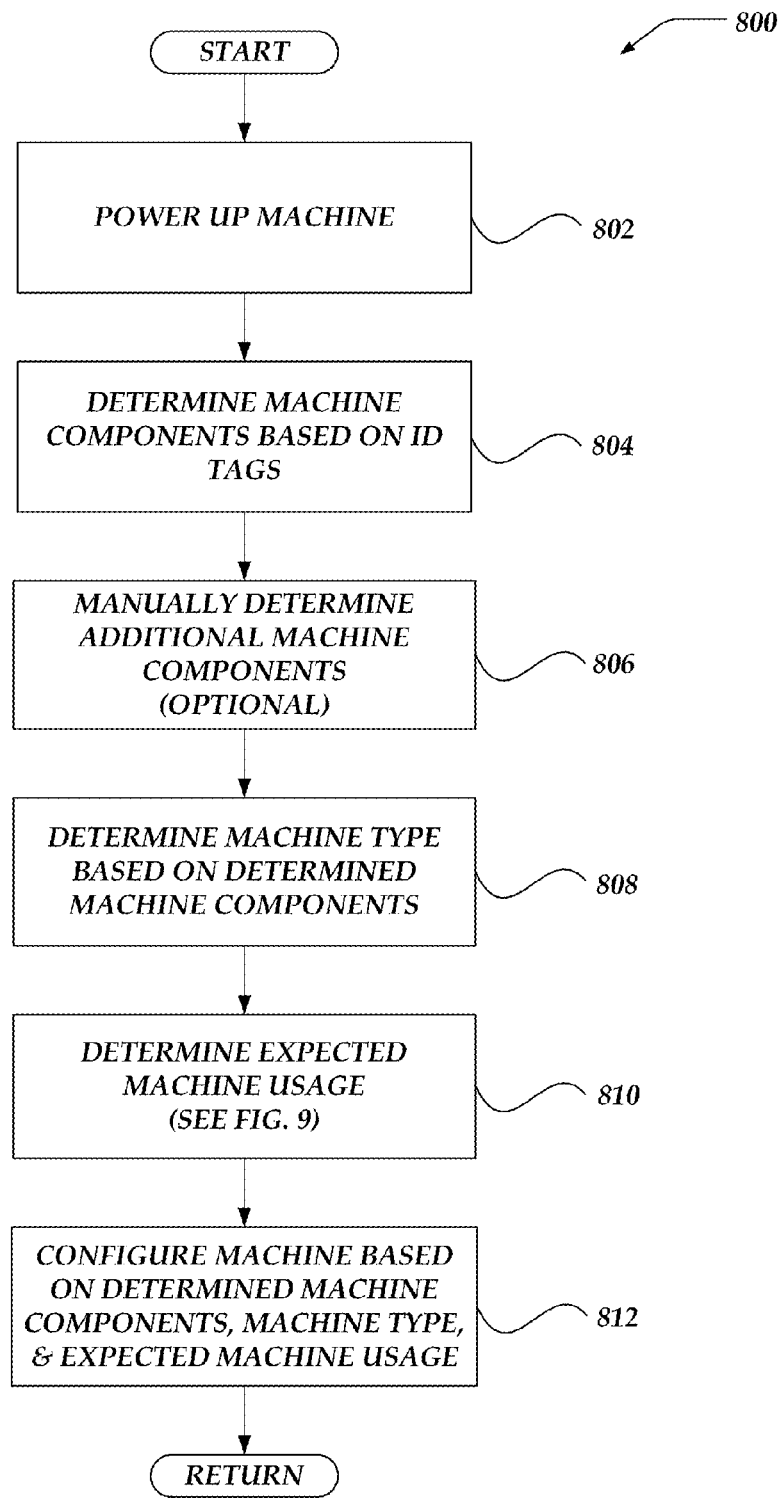
FIG. 8 illustrates a logical flow diagram generally showing one embodiment of a process for identifying and configuring a machine that includes a collection of modular machine components.

FIG. 8 illustrates a logical flow diagram generally showing one embodiment of a process for identifying and configuring a machine that includes a collection of modular machine components. Process 800 begins, after a start block, at block 802, where a machine is powered up. In at least one embodiment, at block 802, a machine may come available online, or is otherwise enabled to communicate to a collection computer or a server computer over a network. In some embodiments, the power plant provides at least a limited amount of power to power up the machine. In some embodiments, an auxiliary power source may provide the power required to power up the machine. For instance, the machine may include one or more batteries that provide at least enough power to power up the machine. In other embodiments, a wall socket, a portable battery, or some other energy source provide at least enough power to power up the machine. In some embodiments, these auxiliary power sources may not provide enough power to fully operate the machine.

Process 800 proceeds to block 804, where machine components included in the machine are determined. At least a portion of the determined machine components may be identified based on one or more ID Tags included with the components. ID Tags may provide machine component identification data to a collection computer when interrogated. The machine component identification data may be provided wirelessly. Each of the ID Tags may correspond to one or more of the components that are coupled to the machine and separately store the component identification data. The component identification data may include at least a component type.

In at least one embodiments, an RFID Tag is remotely interrogated and transmits the machine component identification data to the collection computer. The interrogation may be wireless, i.e. the collection computer or some other device may wirelessly provide a signal to the ID Tag to transmit the component identification data. In other embodiments, the interrogation may be received over a wired network. Accordingly, the component identification data may be communicated. For instance, if the ID TAG includes EEPROM, a voltage on a pin may be transitioned to a read state.

The specific machine component, as well as a machine component type may be determined at block 804. At least a portion of the machine components may be self-identified via an interrogation of or receiving the data stored in the ID Tags. For instance, some of the machine components may be self-identified by an automatic interrogation of one or more of the ID Tags. Accordingly, at least some of the machine components and/or machine component types of the machine may be automatically determined upon powering on of the machine. Thus, self-identifying the machine components may be automatically performed during a power-up cycle of the machine.

In at least one embodiment, once a machine component has been identified, the inclusion of the machine component may be stored with the collection computer, such as collection sever computer 112 of FIG. 1B, or a server computer, such as MCSC 110 of FIG. 1B. Thus, once identified, in some embodiments, it may not be required to interrogate the ID Tags upon each powering up of the machine, unless the arrangement or inclusion of machine components has varied between successive power-up cycles (such as when a machine component has been replaced).

In some embodiments, the functionality or operability of the machine component is determined upon identification of the machine component. For instance, after identification, the collection computer may put the component into a "warming-up" mode or a test mode. In such embodiments, the collection computer may verify that the machine component functions within the manufacture specifications or at least within the limits tested in the test mode. If one or more machine components are determined to not be fully functional, an alert or alarm may be provided to the user.

In some embodiments, at optional block 806, a user is enabled to manually determine additional machine components included in the machine. For instance, some machine components may not include an ID Tag, or the included ID Tag has malfunctioned, or is otherwise not readable upon powering up of the machine. In such instances, a user may manually identify such machine components. In at least one exemplary embodiment, a user of a user interface may manually enter machine components that were not automatically determined or identified during the power-up cycle. In at least one embodiment, one or more machine components are suggested to the user, via the user interface, based on additional machine components that are likely included with the combination of machine components that were self-identified at block 804.

At block 808, the machine type is determined based on at least the determined machine components. In various embodiments, the type of the machine is automatically determined based on the self-identified machine components determined at block 804. The determined machine type may be further based on the manually identified machine components of block 806. The machine type may be based on the specific combination of machine components or machine component types determined or identified at blocks 804 and 806. For instance, a combination of the component types of the components coupled to the machine may be determined. The combination of the component types may include both an amount and type of the components coupled to the machine. The combination of component types may be based on at least the communicated component data. In at least one embodiment, the determined machined type may be based on a comparison of the combination of component types that correspond to a previously determined machine type. In at least one embodiment, the machine includes one or more dedicated ID Tags that include the machine type corresponding to the machine.

The machine type may be determined based on information from one or more databases, such as but not limited to a machine or machine type database. The machine entries in machine database may include lists or tables of machine components typically included in the machine types within the machine database. Such machine component collections included in the machine database may be consulted to determine the machine type. A look-up table may be consulted to determine the machine type. The look-up table may include one or more possible specific combination of machine components or machine component types that map or correspond to the machine type.

As noted throughout, a statistical analysis may be performed, and statistical probabilities assigned to one or more potential machine types. In at least one embodiment, a heuristic may be employed to determine the machine type. The database entries, look-up tables, statistical models, and heuristics may be updated to incorporate or integrate newly generate user or user community data. The user may be prompted to verify the determined machine type.

In some embodiments, in addition to the machine type, the specific instance of the machine may be uniquely determined or identified at block 808. For instance, the specific combination of the specific machine components determined at blocks 804 and 806 may indicate a specific machine. A look-up table may be included in the machine database, where the specific combination of the specific identified machine components indicates a specific machine. A serial number or some other unique identifier may be assigned to uniquely indicate the specific machine. The unique identifier tracks the specific machine in the various databases included in a system database, as well as through the various predictive analyses.

In at least one embodiment, one or more of the ID Tags included in the machine, such as the dedicated machine ID Tag, or any other ID Tag associated with the machine components of the machine, are programmable and/or writable from a distance, i.e. a collection computer, a server computer, or a client device may write information to store information on a ID Tag. According, once the machine or the machine type has been identified, the identified machine type or unique serialization number (or any other type of information or data) may be stored on the dedicated ID Tag. This new stored information may be automatically read, along with the component identification data upon reading of the ID Tags. Accordingly, the information stored in the ID Tags may be updated or adapted during the life cycle of the machine or the components of the machine.

At block 810, the expected machine usage is determined. Various embodiments of determining the expected usage of the machine are discussed in the context of process 900 of FIG. 9. However briefly, once the machine has been identified, predictive analyses or heuristics are utilized to determine an expected usage of the machine. The expected usage may be based on the machine type, the geo-location of the machine, a previous machine usage, the specific machine operator, the user's social network, network of machine users, and the like. For instance, the previous usage may be based on a prior use of the specifically identified machine and/or a previous usage of another machine that is of an equivalent or similar machine type. In at least one embodiment, determining an expected machine location may include determining a geo-location of the machine. The expected machine usage may include at least a maximum power required for the expected machine usage.

The expected usage may be based on a specific application of the machine, such as an application defined by a user. The expected usage may be further based on the operator or user of the machine, user permissions of the user, geo-location or environment of the user, and the like. A predictive analysis determines the likely expected use of the machine based on knowledge of how the machine (and/or other machines of similar machine type) was previously used, location, user community, and the like. Information included in a system database may be used in the predictive analysis, including but not limited to a machine & component usage database, a user database, or a user community database. In at least one embodiment, the expected usage may be provided to the system. The provided machine usage may be based on at least one of the machine type, the geo-location of the machine, or the previously determined machine usage. As discussed throughout the provided expected machine usage may include at least the maximum power required for the expected machine usage.

At block 812, the machine is configured. The machine may be configured based on at least one of the determined machine components/component type or the expected machine usage. In at least one embodiment, the machine is configured based on the determined machine type and/or the specific instance of the machine. In at least one embodiment, the determined configuration may be based on specific components, the machine operator, user permission, machine geo-location and environment, previous machine usage, and the like. The user may be prompted to verify the configuration. In at least one embodiment, a portion of the machine components are individually configured based on the determined.

In at least one embodiment, the configuration is based on the geo-location and/or environmental factors. For instance, the machine may be configured differently if the machine is located in a desert environment, as opposed to a forest, coastal, or mountainous environment.

A configuration may include a machine configuration, as well as configurations for the individual machine components included in the machine. Configuration files (machine and/or machine component files) may be loaded from various configuration libraries included in the system database based on the determined configurations for each of the components. The user may update the various configurations during the operation of the machine. In at least one embodiment, the system tests the functionality of the machine components once the machine components are configured. Process 800 may be an adaptive process, that provides feedback loops to adapt and/or update the configuration of the machine, as the usage or operation of the machine is varied or changes over time. Process 800 may terminate and/or return to a calling process to perform other actions.

Figure 9:
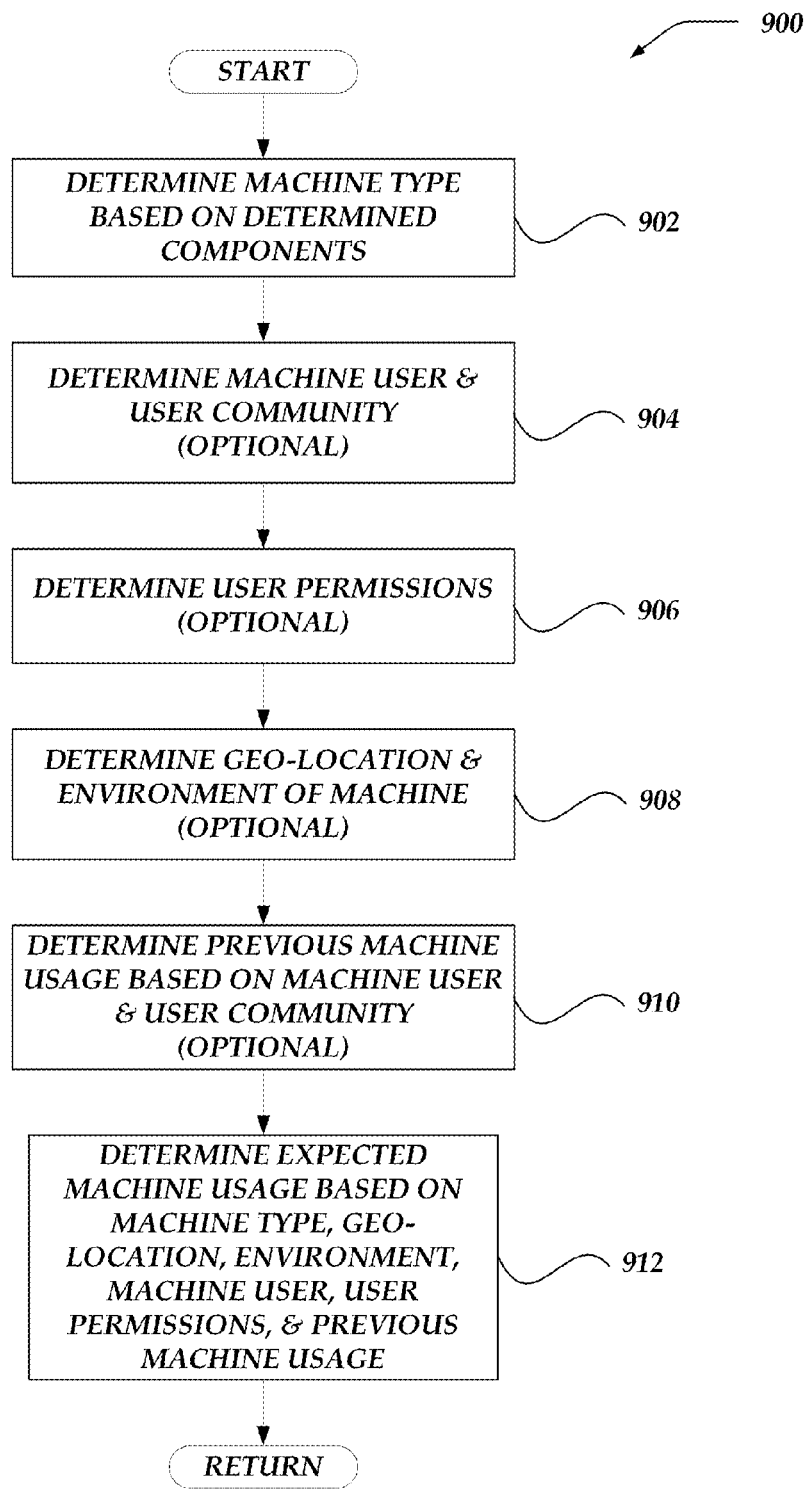
FIG. 9 illustrates a logical flow diagram generally showing one embodiment of a process for determining an expected machine usage, where the machine includes a collection of modular machine components.

FIG. 9 illustrates a logical flow diagram generally showing one embodiment of a process 900 for determining an expected machine usage, where the machine includes a collection of modular machine components. Determining an expected machine usage may include determining an expected peak power required for the expected machine usage. Essentially, process 900 provides one or more predictive analyses for determining the expected usage of a machine, including at least the expected peak power required for the operation of the machine. The predictive analyses is based on various known factors about the type and specific machine, including previous use (nominal, average, peak power), machine operator, environment (desert, jungle, high altitude, forest, underwater, and the like), user permissions, regulatory schemes that govern the usage of machine, and other such factors that are useful to predict the expected usage.

The previous usage may be based on previous machine monitoring, for instance monitoring and logging the sensor data during previous usages of the machine, via one or more telemetry datastreams. This prior knowledge may be stored in the system database. As noted throughout, process 900 may be an adaptive process, and thus the various predictions, determinations, or heuristics may be updated or adapted as new information regarding the machine becomes available to the embodiments. For instance, a predicative heuristic may be updated when new information becomes available via a telemetry datastream received during monitoring of the machine, a user social network, or a machine user network is updated.

In some embodiments, the expected machine usage includes at least a minimum threshold and a maximum threshold for the electrical energy to be provided by the batteries to the machine is determined. The thresholds may be based on at least one of the machine type, the expected machine usage, or the current configuration of the power plant. For instance, at least one of the thresholds may be determined based the geo-location of the machine. In some embodiments, the thresholds are based on the peak amount of electrical energy that is currently available from the batteries.

Process 900 may begin, after at start block, at block 902, where a machine type is determined based on the determined and/or self-identified components. In at least one embodiment, at block 902, the machine type is determined in a similar manner as discussed in regards to block 808 of process 800 of FIG. 8. For instance, ID Tags associated with the machine components may enable the self-identification of the machine components/component types and the machine/machine type. As such, a machine database may be queried to determine the machine.

At optional block 904, a machine user may be determined. The machine user may be a machine operator. The machine operator may locally or remotely operate the machined. For instance, the machine may be at least partially operated via remote or local user interface. A user may be determined by prompting the user for user credentials. Furthermore, a user social network and/or a machine user network may be determined at block 904.

At optional block 906, user permissions may be determined. User permissions may be determined via user credentials. In at least one embodiment, a user database 722 may be accessed to determine the user, as well as user permissions. Additionally, the user community database may be used to determine the social and machine user networks.

At optional block 908, the geo-location of the machine is determined. In some embodiments, the geo-location or global position is determined by employing at least a GPS transceiver. One of the sensor components included in machine may be a GPS transceiver. In other embodiments, a GPS transceiver included in a collection computer, a server computer, or a client computer may provide the geo-location. Once the geo-location is determined, various environmental factors are determinable by process 900. For instance, the machine's elevation may be determined. It may also be determined if the machine is located in a desert, coastal, mountainous, forested, or humid environment. In at least one embodiment, the configuration of the machine is based on the geo-location or environmental factors determined at block 908. In at least one embodiment, the environment is automatically determined. A user may be prompted to verify or confirm the automatically determined environment and/or geo-location.

At optional block 910, the previous machine usage is determined. In at least one embodiment, a machine and component database is queried to determine the previous machine usage. The previous machine usage may be based on previous telemetry datastreams associated with the specific instance of the machine and/or specific components included in the machine. The previous machine usage may include values for the sensor data collected during previous usages of the machine. For instance, the previous machine usage may include nominal, weighted averages, or peak values of the sensor data. In at least one embodiment, the previous machine usage includes statistical distributions of previous sensor data values. In some embodiments, the previous machine usage is based on the user's previous use. Additionally, the machine's previous usage may be based on a community of users of similar machines and/or one or more social networks of the user. Accordingly, the previous usage may be based on heuristics generated via crowdsourced data. At block 910, the peak power required for the operation of the machine in various applications may be determined.

At block 912, the expected machine usage is determined. The determination of the expected machine usage is based on at least one of the determined machine type, geo-location, environment, machine user, user permissions, user community, the previous machine usage, and the like. In some embodiments, the expected machine usage includes at least a minimum threshold and a maximum threshold for the electrical energy to be provided by the batteries to the machine is determined.

The thresholds may be based on at least one of the machine type, the expected machine usage, or the current configuration of the power plant. For instance, at least one of the thresholds may be determined based the geo-location of the machine. In some embodiments, the thresholds are based on the peak amount of electrical energy that is currently available from the batteries. At block 912, the thresholds may be dynamically provided to a system, subsystem, or platform, such as but not limited to platform 140 or system 100 of FIG. 1B.

The determination of the expected machine usage may included a predictive analysis that incorporates information from any of the databases included in a system database, as well as user supplied information. In at least one embodiment, a suite of heuristics is employed to integrate and blend the various sources of data to determine the machine's expected use. As with the previous machine usage, the expected machine usage may include nominal, weighted averages, peak values, or statistical distributions of expected sensor data.

In some embodiments, a maintenance schedule for the machine is machine is determined at block 912. The maintenance schedule may be based on the machine's components, the user community, the geo-location of the machine, the environment of the machine, the previous machine usage, the expected machine usage, and the like.

As noted throughout, process 900 may be an adaptive process. As such, the expected machine usage may be periodically updated to incorporate data regarding the actual machine usage. For instance, as statistical distributions of actual sensor data becomes available, these distributions may be included or incorporated in the determined expected machine usage. The expected machine usage may be updated via a Bayesian-like process, where the previous sensor data distributions represent the prior knowledge, and the actual sensor data distributions are utilized to update the prior knowledge. In this way, the expected machine usage is adapted, over time, to more accurately reflect the actual machine usage. After block 912, process 900 may terminate and/or return to a calling process to perform other actions.

Figure 10:
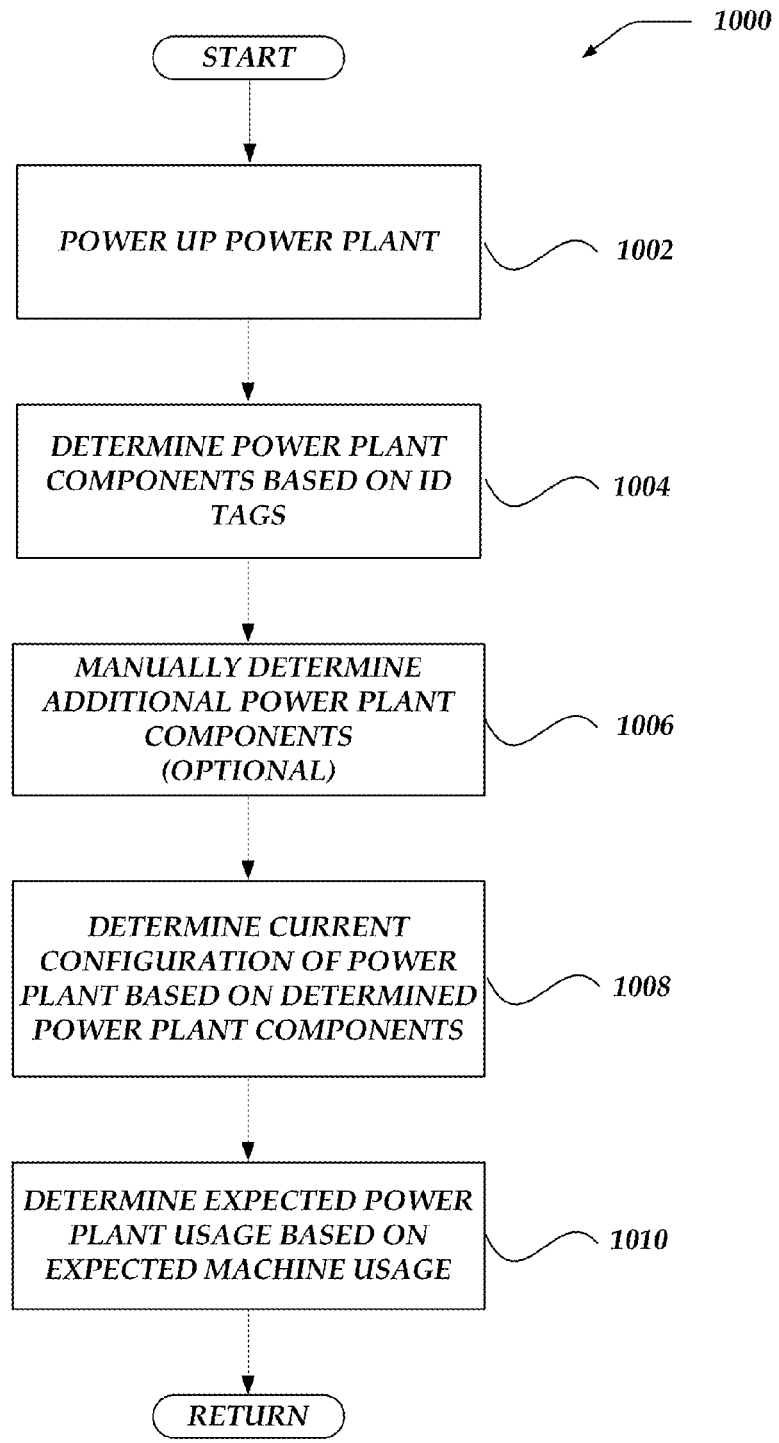
FIG. 10 illustrates a logical flow diagram generally showing one embodiment of a process for determining a current configuration of a power plant that includes a collection of modular power plant components.

FIG. 10 illustrates a logical flow diagram generally showing one embodiment of a process 1000 for determining a current configuration of a power plant that includes a collection of modular power plant components. Process 1000 begins, after a start block, at block 1002, where a power plant is powered up. In at least one embodiment, at block 1002, the power plant may come available online, or is otherwise enabled to communicate to a collection computer or a server computer over a network. In some embodiments, powering up the power plant includes starting at least one of the one or more engines. In some embodiments, a power plant includes and engine starter that starts up at least one of the one or more engines. In some embodiments, an auxiliary power source may provide the power required to power up the power plant. One or more of the batteries included in the power plant may provide at least enough power to power up the power plant. In other embodiments, a wall socket, a portable battery, or some other energy source may provide at least enough power to power up the power plant.

Process 1000 proceeds to block 1004, where power plant components included in the power plant are determined. At least a portion of the determined power plant components may be identified based on one or more ID Tags included with the power plant components. ID Tags may provide power plant component identification data to a collection computer when interrogated. The power plant component identification data may be provided wirelessly. In at least one embodiments, an RFID Tag is remotely interrogated and transmits the power plant component identification data to the collection computer. The interrogation may be wireless, i.e. the collection computer or some other device may wirelessly provide a signal to the ID Tag to transmit the component identification data. In other embodiments, the interrogation may be received over a wired network. For instance, if the ID TAG includes EEPROM, a voltage on a pin may be transitioned to a read state.

The specific power plant component, as well as a power plant component type may be determined at block 1004. At least a portion of the power plant components may be self-identified via an interrogation of or receiving the data stored in the ID Tags. For instance, some of the power plant components may be self-identified by an automatic interrogation of one or more of the ID Tags. Accordingly, at least some of the power plant components and/or power plant component types of the machine may be automatically determined upon powering on of the power plant. Thus, self-identifying the power plant components may be automatically performed during a power-up cycle of the power plant.

In at least one embodiment, once a power plant component has been identified, the inclusion of the power plant component may be stored with the collection computer, such as collection sever computer 112 of FIG. 1B, or a server computer, such as MCSC 110 of FIG. 1B. The collection computer may be included in the power plant or the machine. Thus, once identified, in some embodiments, it may not be required to interrogate the ID Tags upon each powering up of the power plant, unless the arrangement or inclusion of power components has varied between successive power-up cycles (such as when a power plant component has been replaced).

In some embodiments, the functionality or operability of the power plant component is determined upon identification of the power plant component. For instance, after identification, the collection computer may put the power plant component into a "warming-up" mode or a test mode. In such embodiments, the collection computer may verify that the power plant component functions within the manufacture specifications or at least within the limits tested in the test mode. If one or more power plant components are determined to not be fully functional, an alert or alarm may be provided to the user.

In some embodiments, at optional block 1006, a user is enabled to manually determine additional power plant components included in the power. For instance, some power plant components may not include an ID Tag, or the included ID Tag has malfunctioned, or is otherwise not readable upon powering up of the power plant. In such instances, a user may manually identify such power plant components. In at least one exemplary embodiment, a user of a user interface may manually enter power plant components that were not automatically determined or identified during the power-up cycle. In at least one embodiment, one or more machine components are suggested to the user, via the user interface, based on additional power plant components that are likely included with the combination of power plant components that were self-identified at block 1004.

At block 1008, the current configuration of the power plant is determined based on at least the determined power plant components. In various embodiments, the current configuration of the power plant is automatically determined based on the self-identified power plant components determined at block 1004. The determined current configuration of the power plant may be further based on the manually identified machine components of block 1006. The current configuration of the power plant may be based on the specific combination of power plant components or power plant component types determined or identified at blocks 1004 and 1006. For instance, a combination of the component types of the components coupled to the power plant may be determined. The combination of the component types may include both an amount and type of the components coupled to the power plant. The combination of component types may be based on at least the communicated component data. In at least one embodiment, the determined current configuration of the power plant may be based on a comparison of the combination of component types that correspond to a previously determined configuration of the power plan. In at least one embodiment, the power plant includes one or more dedicated ID Tags that include the current configuration of the power plant. The current configuration of the power plant may be provided to a system or a platform, such as platform 140 of system 100 of FIG. 1B.

In various embodiments, the current configuration of the power plant includes at least a current number of batteries included in the one or more battery arrays. The current configuration may include the types of batteries that are included in the battery arrays. In some embodiments, the current configuration may include a number of and specifically which batteries are currently electronically coupled to the one or more power busses of the power plant, via switches.

In some embodiments, the current configuration of the power plant includes at least a minimum threshold and a maximum threshold for the electrical energy to be provided by the batteries to the machine is determined. The thresholds may be based on at least one of the machine type, the expected machine usage, or the current configuration of the power plant. For instance, at least one of the thresholds may be determined based the geo-location of the machine. In some embodiments, the thresholds are based on the peak amount of electrical energy that is currently available from the batteries. Accordingly, the thresholds may be based on at least the current number of batteries included in the one or more battery arrays or the number of batteries that are currently electronically coupled to the one or more power busses.

The current configuration of the power plan may be determined based on information from one or more databases, such as but not limited to a power plant database. In some embodiments, in addition to the current configuration of the power plant, the specific instance of the power plant may be uniquely determined or identified at block 1008. For instance, the specific combination of the specific power plant components determined at blocks 1004 and 1006 may indicate a specific power plant. A look-up table may be included in the power plant database, where the specific combination of the specific identified power plant components indicates a specific power plant. A serial number or some other unique identifier may be assigned to uniquely indicate the specific power plant. The unique identifier tracks the specific power plant in the various databases included in a system database, as well as through the various predictive analyses.

In at least one embodiment, one or more of the ID Tags included in the power plant, such as the dedicated power plant ID Tag, or any other ID Tag associated with the power plant components of the power plant, are programmable and/or writable from a distance, i.e. a collection computer, a server computer, or a client device may write information to store information on a ID Tag. According, once the power plant or the current configuration of the power plant has been determined, the determined current configuration of the power plant or unique serialization number (or any other type of information or data) may be stored on the dedicated ID Tag. This new stored information may be automatically read, along with the component identification data upon reading of the ID Tags. Accordingly, the information stored in the ID Tags may be updated or adapted during the life cycle of the power plant or the components of the power plant.

At block 1010, the expected power plant usage may be determined. The expected power plant usage may be based the expected machine usage. The expected power plant usage may be based on the current configuration of the power plant, the geo-location or environment of the power plant, a previous usage of the power plant, or the like.

In some embodiments, the current configuration may include minimum number of batteries for the expected machine usage. When the modular battery arrays include the minimum number of batteries, the maximum threshold for the electrical energy provided by the batteries to the machine corresponds to the maximum power required for the expected machine usage. Accordingly, the minimum number of batteries may be based on at least the expected machine usage. After block 1010, process 1000 may terminate and/or return to a calling process to perform other actions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system to manage an operation of a machine, comprising:
    a modular power plant configured to provide power to the machine, including:
        one or more engines that generate mechanical energy;
        one or more generators that convert at least a portion of the mechanical energy into electrical energy; and
        a plurality of batteries that store at least a portion of the electrical energy; and
    a network computing device that executes logical operations to perform actions, comprising:
        providing a machine type based on both an amount and a component type of one or more components that are coupled to the machine;
        dynamically providing a minimum threshold and a maximum threshold associated with electrical energy provided by the plurality of batteries to the machine, wherein the thresholds are based on one or more of the machine type, a geo-location of the machine, or a peak amount of electrical energy that is currently available from the plurality of batteries; and
        providing the power to operate the machine, wherein the power includes one or more of electrical energy or mechanical energy.

2. The system of claim 1, wherein the power plant is integrated with a skid that is mechanically couplable to the machine.

3. The system of claim 1, the actions further comprising:
    providing a current configuration of the power plant, wherein the current configuration of the power plant includes at least a current number of batteries included in the plurality of batteries; and
    dynamically determining the minimum threshold and the maximum threshold associated with electrical energy provided by the plurality of batteries to the machine based on at least the current number of batteries included in the plurality of batteries.

4. The system of claim 1, wherein the power plant further includes at least one of:
    a heating, ventilation, and air conditioning (HVAC) system that during the operation of the machine, at least partially controls environmental conditions within a cabin of the machine and at least one of the one or more generators or the plurality of batteries provide power to the HVAC system; or
    a cooling system that during the operation of the machine, at least partially cools the one or more engines and at least one of the one or more generators or the plurality of batteries provide power to the HVAC system.

5. The system of claim 1, the actions further comprising:
    providing an expected machine usage based on at least one of the machine type, the geo-location of the machine, or a previously determined machine usage, wherein the expected machine usage includes at least a maximum power required for the expected machine usage; and
    determining a minimum number of batteries based on the maximum power required to provide the expected machine usage such that when the plurality of batteries includes the minimum number of batteries, the maximum threshold associated with the electrical energy provided by the plurality of batteries to the machine corresponds to the maximum power required for the expected machine usage.

6. The system of claim 1, wherein the system further comprises a plurality of component identification (ID) Tags that separately store component identification data, wherein each of the plurality of ID Tags corresponds to one of the one or more components that are coupled to the machine and the component identification data includes at least a component type, wherein the actions further comprise:
    communicating the component identification data;
    determining a combination of the component types based on at least the component identification data; and
    automatically determining the machine type based on a comparison of the combination of the component types and one or more previously provided combinations of component types that correspond to a previously determined machine type.

7. The system of claim 1, wherein the power plant further includes
    one or more switches that selectively electrically couple each of the plurality of batteries to one or more power busses that provide the power to operate the machine and the actions further comprises:
        employing the one or more switches to selectively couple at least one of the plurality of batteries to the one or more power buses based on at least an expected machine usage.

8. A method to manage an operation of a machine, wherein the execution of instructions, by one or more processors, performs actions to operate the machine, comprising:
    employing one or more engines to generate mechanical energy;
    employing one or more generators to convert at least a portion of the mechanical energy into electrical energy;
    employing a plurality of batteries to store at least a portion of the electrical energy, wherein the one or more engines, the one or more generators, and the plurality of batteries are included in a modular power plant adapted for providing power to the machine, wherein the power plant is integrated with a skid that is mechanically couplable to the machine;

providing a machine type based on both an amount and a component type of one or more components that are coupled to the machine;

dynamically providing a minimum threshold and a maximum threshold associated with electrical energy provided by the plurality of batteries to the machine, wherein the thresholds are based on one or more of the machine type, a geo-location of the machine, or a peak amount of electrical energy that is currently available from the plurality of batteries; and providing the power to operate the machine, wherein the power includes one or more of electrical energy or mechanical energy.

9. The method of claim 8 further comprising:

providing a current configuration of the power plant, wherein the current configuration of the power plant includes at least a current number of batteries included in the plurality of batteries; and dynamically determining the minimum threshold and the maximum threshold associated with electrical energy provided by the plurality of batteries to the machine based on at least the current number of batteries included in the plurality of batteries.

10. The method of claim 8, wherein the power plant further includes at least one of:

a heating, ventilation, and air conditioning (HVAC) system that during the operation of the machine, at least partially controls environmental conditions within a cabin of the machine and at least one of the one or more generators or the plurality of batteries provide power to the HVAC system; or a cooling system that during the operation of the machine, at least partially cools the one or more engines and at least one of the one or more generators or the plurality of batteries provide power to the HVAC system.

11. The method of claim 8 further comprising:

providing an expected machine usage based on at least one of the machine type, the geo-location of the machine, or a previously determined machine usage, wherein the expected machine usage includes at least a maximum power required for the expected machine usage; and determining a minimum number of batteries based on the maximum power required to provide the expected machine usage such that when the plurality of batteries includes the minimum number of batteries, wherein the maximum threshold associated with the electrical energy provided by the plurality of batteries to the machine corresponds to the maximum power required for the expected machine usage.

12. The method of claim 8 further comprising:

communicating, to a computer, component identification data separately stored in each of a plurality of component identification (ID) Tags that correspond to at least one of the one or more components coupled that are coupled to the machine, wherein the component identification data includes at least a component type determining a combination of the component types based on at least the component identification data; and automatically determining the machine type further based on a comparison of the combination of the component types and one or more previously provided combinations of component types that correspond to a previously determined machine type.

13. The method of claim 8, wherein the power plant further includes one or more switches that selectively electrically couple each of the plurality of batteries to one or more power busses that provide the power to operate the machine, wherein the method further comprises:

employing the one or more switches to selectively couple at least one of the plurality of batteries to the one or more power buses based on at least an expected machine usage.

14. A processor readable non-transitory storage media that includes instructions to manage an operation of a machine, wherein the execution of the instructions by a processor performs actions, comprising:

providing a machine type for the machine based on both an amount and a component type of one or more components that are coupled to the machine;

dynamically providing a minimum threshold and a maximum threshold for electrical energy provided by a plurality of batteries to the machine, wherein the thresholds are based on one or more of the machine type, a geo-location of the machine, or a peak amount of electrical energy that is currently available from the plurality of batteries; and employing a modular power plant to provide the power to operate the machine, wherein the power includes one or more of electrical energy or mechanical energy and the modular power plant includes:

one or more engines that generate mechanical energy;

one or more generators that convert at least a portion of the mechanical energy into electrical energy; and the plurality of batteries, wherein the plurality of batteries store at least a portion of the electrical energy.

15. The media of claim 14, the actions further comprising:

providing a current configuration of the power plant, wherein the current configuration of the power plant includes at least a current number of batteries included in the plurality of batteries; and dynamically determining the minimum threshold and the maximum threshold associated with electrical energy provided by the plurality of batteries to the machine based on at least the current number of batteries included in the plurality of batteries.

16. The media of claim 14, wherein the power plant further includes at least one of:

a heating, ventilation, and air conditioning (HVAC) system that during the operation of the machine, at least partially controls environmental conditions within a cabin of the machine and at least one of the one or more generators or the plurality of batteries provide power to the HVAC system; or a cooling system that during the operation of the machine, at least partially cools the one or more engines and at least one of the one or more generators or the plurality of batteries provide power to the HVAC system.

17. The media of claim 14, the actions further comprising:

providing an expected machine usage based on at least one of the machine type, the geo-location of the machine, or a previously determined machine usage, wherein the expected machine usage includes at least a maximum power required to provide the expected machine usage; and determining a minimum number of batteries based on the maximum power required for the expected machine usage such that when the plurality of batteries includes the minimum number of batteries, the maximum threshold for the electrical energy provided by the plurality of batteries to the machine corresponds to the maximum power required for the expected machine usage.

18. The media of claim 14, the actions further comprising:
communicating component identification data separately stored in each of a plurality of component identification (ID) Tags that correspond to at least one of the one or more components coupled that are coupled to the machine, wherein the component identification data includes at least a component type
determining a combination of the component types based on at least the component identification data; and
automatically determining the machine type further based on a comparison of the combination of the component types and one or more previously provided combinations of component types that correspond to a previously determined machine type.

19. The media of claim 14, wherein the power plant further includes one or more switches that selectively electrically couple each of the plurality of batteries to one or more power busses that provide the power to operate the machine, the actions further comprising:
employing the one or more switches to selectively couple at least one of the plurality of batteries to the one or more power buses based on at least an expected machine usage.

* * * * *